(12) United States Patent
Kang et al.

(10) Patent No.: US 12,498,787 B2
(45) Date of Patent: Dec. 16, 2025

(54) WEARABLE DEVICE, METHOD AND COMPUTER READABLE STORAGE MEDIUM FOR IDENTIFYING GAZE OF USER

(71) Applicant: Samsung Electronics Co., Ltd., Suwon-si (KR)

(72) Inventors: Jinmo Kang, Suwon-si (KR); Gunhee Lee, Suwon-si (KR); Sunyoung Jung, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/742,921

(22) Filed: Jun. 13, 2024

(65) Prior Publication Data

US 2025/0068234 A1 Feb. 27, 2025

Related U.S. Application Data

(63) Continuation of application No. PCT/KR2024/007299, filed on May 29, 2024.

(30) Foreign Application Priority Data

Aug. 21, 2023 (KR) .................. 10-2023-0109431
Oct. 6, 2023 (KR) .................. 10-2023-0133511

(51) Int. Cl.
*G06F 3/01* (2006.01)
(52) U.S. Cl.
CPC .................. *G06F 3/013* (2013.01)

(58) Field of Classification Search
CPC ... G06F 3/013; G02B 27/017; G02B 27/0093; G06V 40/18
See application file for complete search history.

(56) References Cited

U.S. PATENT DOCUMENTS

| | | | |
|---|---|---|---|
| 10,277,787 B2 | 4/2019 | Andersson et al. | |
| 11,176,688 B2 | 11/2021 | Heo et al. | |
| (Continued) | | | |

FOREIGN PATENT DOCUMENTS

| | | | | |
|---|---|---|---|---|
| CN | 110333810 A | * | 10/2019 | ......... G06F 3/04817 |
| JP | 2016161973 A | * | 9/2016 | |
| (Continued) | | | | |

OTHER PUBLICATIONS

Search Report and Written Opinion dated Sep. 19, 2024 issued in International Patent Application No. PCT/KR2024/007299.

*Primary Examiner* — Stephen G Sherman
(74) *Attorney, Agent, or Firm* — Nixon & Vanderhye, P.C

(57) ABSTRACT

A wearable device according to an embodiment includes: at least one camera configured for eye tracking, at least one display configured to be aligned with eyes of a user wearing the wearable device, and at least one processor comprising processing circuitry. At least one processor, individually and/or collectively, is configured to: control the wearable device to display a screen on the at least one display; obtain gaze data related to an object in the screen through the at least one camera; determine whether to recognize the gaze data as an input for the object, using an area for the object that has size set based on an overall brightness level of the screen; and execute a function provided from the object based on the gaze data recognized as the input.

20 Claims, 17 Drawing Sheets

(56) References Cited

U.S. PATENT DOCUMENTS

| | | | |
|---|---|---|---|
| 11,557,020 B2 | 1/2023 | Connor | |
| 2018/0150134 A1 | 5/2018 | Lee et al. | |
| 2019/0377538 A1* | 12/2019 | Jones | G06F 3/011 |
| 2022/0215641 A1* | 7/2022 | Wakayama | G06T 19/20 |
| 2024/0265603 A1 | 8/2024 | Yoo et al. | |

FOREIGN PATENT DOCUMENTS

| | | | |
|---|---|---|---|
| KR | 10-0590659 | | 6/2006 |
| KR | 101094766 B1 | | 12/2011 |
| KR | 10-2015-0108282 | | 9/2015 |
| KR | 10-2017-0087728 | | 7/2017 |
| KR | 20220032448 A | * | 3/2022 |
| KR | 10-2023-0066248 | | 5/2023 |
| KR | 10-2023-0089502 | | 6/2023 |

\* cited by examiner

WEARABLE DEVICE, METHOD AND COMPUTER READABLE STORAGE MEDIUM FOR IDENTIFYING GAZE OF USER

CROSS-REFERENCE TO RELATED APPLICATIONS

This application is a continuation of International Application No. PCT/KR2024/007299 designating the United States, filed on May 29, 2024, in the Korean Intellectual Property Receiving Office and claiming priority to Korean Patent Application Nos. 10-2023-0109431, filed on Aug. 21, 2023, and 10-2023-0133511, filed on Oct. 6, 2023, in the Korean Intellectual Property Office, the disclosures of each of which are incorporated by reference herein in their entireties.

BACKGROUND

Field

The present disclosure relates to a wearable device, method, and computer readable storage medium for identifying gaze of a user.

Description of Related Art

In order to provide an enhanced user experience, an electronic device that provide an extended reality (XR) service that displays information generated by a computer in association with an external object in the real-world is being developed. The electronic device may provide the extended reality service to a user using a virtual object corresponding to the user.

The above-described information may be provided as a related art for the purpose of helping understand the present disclosure. No argument or decision is made as to whether any of the above-described content may be applied as a prior art associated with the present disclosure.

SUMMARY

A wearable device according to an example embodiment may comprise: at least one camera configured to perform eye tracking, at least one display configured to be aligned with eyes of a user wearing the wearable device, and at least one processor comprising processing circuitry. At least one processor, individually and/or collectively, may be configured to: control the wearable device to display a screen on the at least one display. At least one processor, individually and/or collectively, may be configured to obtain gaze data related to an object in the screen through the at least one camera. At least one processor, individually and/or collectively, may be configured to determine whether to recognize the gaze data as an input for the object, using an area for the object that has size set based on an overall brightness level of the screen. At least one processor, individually and/or collectively, may be configured to execute a function provided from the object based on the gaze data recognized as the input.

A wearable device according to an example embodiment may comprise: at least one camera configured for eye tracking, at least one display configured to be aligned with eyes of a user wearing the wearable device, and at least one processor comprising processing circuitry. At least one processor, individually and/or collectively, may be configured to: control the wearable device to display a screen on the at least one display. At least one processor, individually and/or collectively, may be configured to obtain gaze data located adjacent to the object in the screen through the at least one camera. At least one processor, individually and/or collectively, may be configured to obtain information on a size of a pupil of the eye through the at least one camera. At least one processor, individually and/or collectively, may be configured to recognize the gaze data as an input for the object in response to the size being a first size, and to enable a function provided from the object based on the gaze data recognized as the input. At least one processor, individually and/or collectively, may be configured to maintain disabling the function by determining to not recognize the gaze data as the input in response to the size being a second size larger than the first size.

A method executed in a wearable device having at least one camera configured for eye tracking, and at least one display configured to be aligned with eyes of a user wearing the wearable device according to an example embodiment, the method may comprise displaying a screen on the at least one display. The method may comprise obtaining gaze data related to an object in the screen through the at least one camera. The method may comprise determining whether to recognize the gaze data as an input for the object, using an area for the object that has size set based on an overall brightness level of the screen. The method may comprise executing a function provided from the object based on the gaze data recognized as the input.

A non-transitory computer-readable storage medium storing one or more programs according to an example embodiment, the one or more programs, when executed by at least one processor, individually and/or collectively, of a wearable device having at least one camera configured for eye tracking and the at least one display configured to be aligned with eyes of a user wearing the wearable device, may comprise instructions that cause the wearable device to display a screen on the at least one display. The one or more programs, when executed by a wearable device, may comprise instructions that cause the wearable device to obtain gaze data related to an object in the screen through the at least one camera. The one or more programs, when executed by a wearable device, may comprise instructions that cause the wearable device to determine whether to recognize the gaze data as an input for the object, using an area for the object that has size set based on an overall brightness level of the screen. The one or more programs, when executed by a wearable device, may comprise instructions that cause the wearable device to execute a function provided from the object based on the gaze data recognized as the input.

A wearable device according to an example embodiment may comprise: at least one camera configured for eye tracking, at least one display configured to be aligned with eyes of a user wearing the wearable device, and at least one processor comprising processing circuitry. At least one processor, individually and/or collectively, may be configured to: control the wearable device to display a screen on the at least one display. At least one processor, individually and/or collectively, may be configured to obtain the user's state information related to the eye and gaze data related to the object in the screen through the at least one camera. At least one processor, individually and/or collectively, may be configured to, based on the object being displayed at a first location in the screen, determine whether to recognize the gaze data as an input for the object using the first area for the object having a size set based on the state information. At least one processor, individually and/or collectively, may be configured to, based on the object being distinct from a first location in the screen and displayed at a second location adjacent to at least one of the edges of the screen, determine whether to recognize the gaze data as an input for the object using a second area for the object having another size set based on the state information. The size of the second area may be set larger than the size of the first area.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
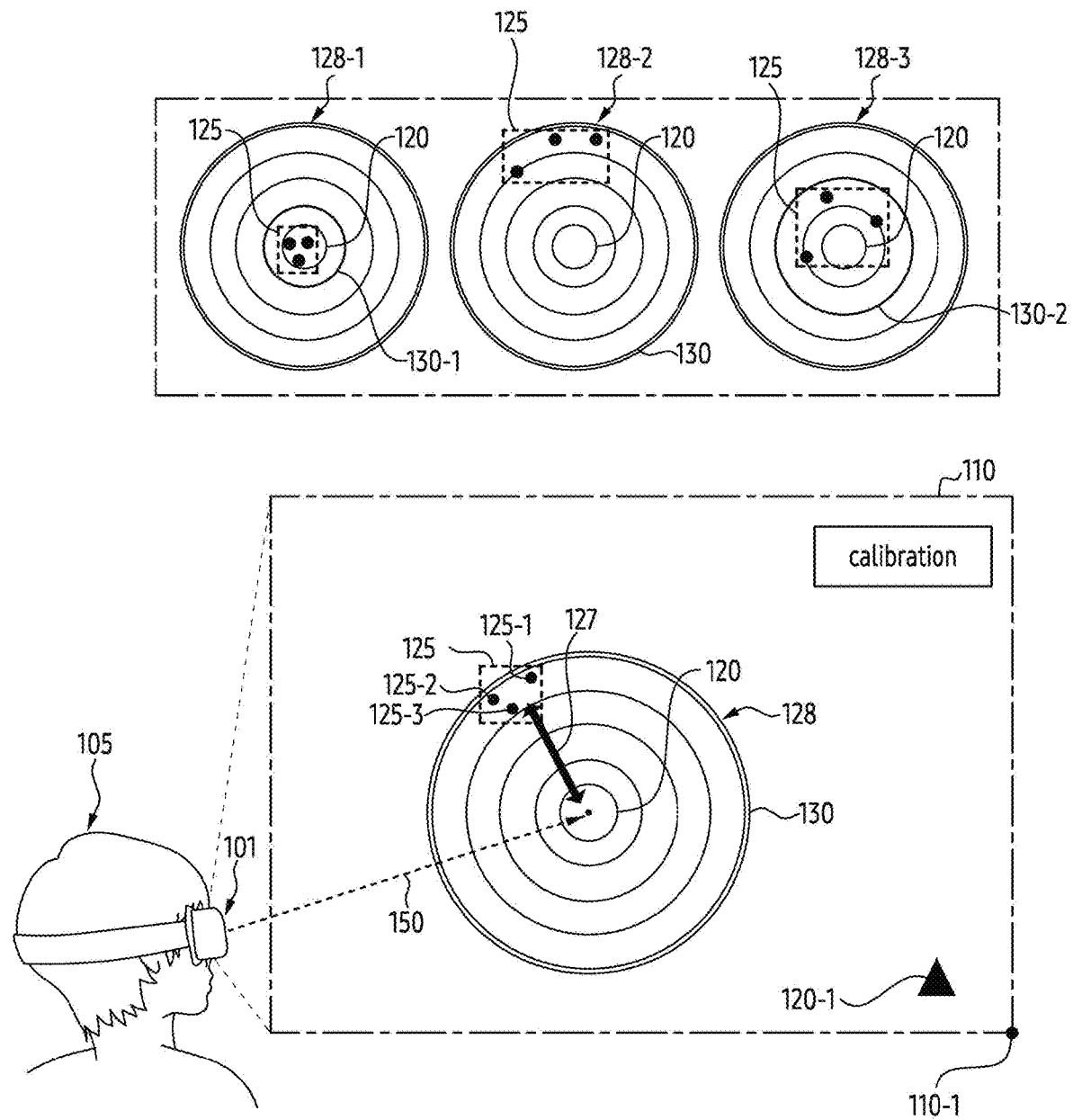
FIG. 1 is a diagram illustrating an example of an operation in which a wearable device obtains a user's gaze data according to various embodiments.

The electronic device according to various embodiments may be one of various types of electronic devices. The electronic devices may include, for example, a portable communication device (e.g., a smartphone), a computer device, a portable multimedia device, a portable medical device, a camera, an electronic device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the wearable device 101 (see, e.g., FIGS. 2A, 2B, 3A and 3B)). For example, a processor (e.g., the processor 420 (see, e.g., FIG. 4)) of the machine (e.g., the wearable device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a diagram illustrating an example operation in which a wearable device obtains a user's gaze data according to various embodiments. In an embodiment, in terms of being owned by the user, a wearable device 101 may be referred to as a terminal (or user terminal). The terminal may include, for example, a personal computer (PC) such as a laptop and a desktop. The terminal may include, for example, a smartphone, a smart pad, and/or a tablet PC. The terminal may include a smart accessory such as a smartwatch and/or a head-mounted device (HMD). It will be understood that the terminal is not limited to the above examples.

The wearable device 101 may include a head-mounted display (HMD) that is wearable on a user 105's head. The wearable devices 101 may be one or more (or plural). The wearable device 101 according to an embodiment may include a camera (e.g., a camera 440 of FIG. 4 to be described in greater detail below) disposed facing front of the user 105 in a state worn by the user 105. The front direction of the user 105 may include a direction in which the user 105's head and/or the user 105's gaze are directed. The wearable device 101 according to an embodiment may include a sensor for identifying a motion of the user's 105 head and/or the wearable device 101 in the state worn by the user 105. The wearable device 101 may identify an angle of the wearable device 101 based on data of the sensor. In order to provide a user interface (UI) based on virtual reality (VR), augmented reality (AR), and/or mixed reality (MR) to the user 105 wearing the wearable device 101, the wearable device 101 may control the camera and/or the sensor. The UI may be related to the wearable device 101, and/or a metaverse service provided by a server connected to the wearable device 101, and/or a notification service.

According to an embodiment, the wearable device 101 may execute a function related to the augmented reality (AR) and/or the mixed reality (MR). For example, in a state in which the user 105 wears the wearable device 101, the wearable device 101 may include at least one lens disposed adjacent to the user's eye. The ambient light passing through the lens may be combined (or mixed) with light emitted from a display (e.g., a display 450 of FIG. 4) of the wearable device 101. A display area of the display may be formed in the lens through which the ambient light passes. Since the wearable device 101 combines the ambient light and the light emitted from the display, the user 105 may see an image in which a real object recognized by the ambient light and a virtual object formed by the light emitted from the display are mixed.

According to an embodiment, the wearable device 101 may execute a function related to video see-through (VST) and/or the virtual reality (VR). In the state in which the user 105 wears the wearable device 101, the wearable device 101 may include a housing covering the user 105's eye. The wearable device 101 may include a display disposed on a first surface (e.g., a first surface 310 of FIG. 3A) facing the eye, in the above state. The wearable device 101 may include a camera (e.g., cameras 260-7, 260-8, 260-9, 260-10, 260-11, and 260-12 of FIG. 3B) disposed on a second surface (e.g., a second surface 320 of FIG. 3A) opposite to the first surface. Using the camera, the wearable device 101 may obtain frame images including the ambient light. The wearable device 101 may output the frame images in the display disposed on the first surface so that the user 105 recognizes the ambient light through the display. The display area of the display disposed on the first surface may be formed by one or more pixels included in the display. The wearable device 101 may synthesize the virtual object in the frame images outputted through the display in order for the user 105 to recognize the virtual object together with the real object recognized by the ambient light.

According to an embodiment, the wearable device 101 may provide a user experience based on the mixed reality (MR) using a virtual space. The wearable device 101 may generate a virtual space mapped to an external space, by recognizing the external space (e.g., a real space) including the wearable device 101. Space recognition performed by the wearable device 101 may include SLAM and/or space mapping (e.g., scene understanding).

Referring to FIG. 1, although the wearable device 101 is illustrated to display a screen 110 on at least one display, the wearable device 101 may obtain one or more screens using one or more rendering data sets in order to display the screen 110 on the at least one display. For example, since the wearable device 101 includes one or more displays corresponding to both eyes of the user 105, by displaying one or more screens on each of the one or more displays, the wearable device 101 may provide the user 105 with the screen 110 in which at least one or more screens are at least partially overlapped.

The wearable device 101 according to an embodiment may display the screen 110 including a visual object 120 for obtaining the user's gaze data on at least one display. The wearable device 101 may obtain the user 105's gaze data related to the visual object 120 in the screen 110 through the camera. The camera may be referred to as an eye tracking camera (e.g., an eye tracking camera 260-1 of FIGS. 2A to 3B) in terms of being disposed toward the user's eye and including a camera for performing eye tracking. For example, the wearable device 101 may obtain the gaze data using a parameter related to the user's gaze through the camera. The wearable device 101 may infer an eye direction of the user 105 based on identifying a location of each of the pupil, sclera, iris, and/or glint (e.g., gaze detection light reflected from the pupil) included in the user 105's eye. The parameter related to the gaze may include parameters capable of changing an image related to the eye obtained through the camera. For example, the parameters may include a parameter indicating an overall brightness level of the display, illuminance of the ambient light, and/or the user's state information related to the eye.

For example, the wearable device 101 may identify a portion in the screen 110 that matches the inferred eye direction. The wearable device 101 may identify information on the portion viewed by the user 105 in the screen 110, using gaze data 125 indicating the inferred eye direction.

The wearable device 101 according to an embodiment may obtain the gaze data 125 for the visual object 120 included in the screen 110, using the camera. The gaze data 125 may include one or more data sets 125-1, 125-2, and 125-3. For example, the wearable device 101 may perform user calibration in order to identify the gaze data 125 as a user input. The wearable device 101 may obtain an average value for the one or more data sets 125-1, 125-2, and 125-3 obtained based on performing the user calibration as the gaze data 125. However, the disclosure is not limited thereto. After performing the user calibration, the wearable device 101 may obtain the gaze data 125 based on one data set. The user calibration may include an operation of correcting a location corresponding to the gaze data 125 inferred by the wearable device 101, using a location corresponding to the user 105's gaze 150.

For example, the gaze data 125 may be obtained using an image related to the user 105's eye obtained through the camera. The gaze data 125 may indicate a gaze corresponding to the direction of the user 105's eye inferred by the wearable device 101. The gaze data 125 may be identified based on an optical axis corresponding to the eye. The optical axis may include a line connecting a center of the pupil and a center of a cornea curvature.

For example, the wearable device 101 may identify a location where the visual object 120 is displayed on the screen 110. The location where the visual object 120 is displayed may be a location where the user 150's gaze based on the visual axis matches the screen 110. The visual axis may include a line connecting a center of the retina (fovea) and the center of the cornea curvature. The gaze 150 may indicate a location of the screen 110 that the user 105 substantially looks at (or recognizes).

For example, the wearable device 101 may identify accuracy and/or precision of the gaze data 125 obtained through the camera, using the location of the visual object 120 and the gaze data 125. The accuracy may include information indicating a difference 127 between the location of the visual object 120 (or a location where the gaze 150 matches) and a location of the gaze data 125. The location of the gaze data 125 may indicate an average value of the locations of the one or more data sets 125-1, 125-2, and 125-3. The precision may indicate information obtained based on the locations of the one or more data sets 125-1, 125-2, and 125-3. The wearable device 101 may identify degree to which the locations of the one or more data sets 125-1, 125-2, and 125-3 are spread based on a root mean square deviation. The precision may indicate degree to which the one or more data sets 125-1, 125-2, and 125-3 are spread.

According to an embodiment, the wearable device 101 may determine whether to recognize the gaze data 125 as a user input for the visual object 120, based on the accuracy and/or the precision related to the user 105's gaze data 125. The wearable device 101 may set an area for selecting the visual object 120 using the gaze data 125. The wearable device 101 may obtain an area 130 having a size set based on the gaze data 125. The wearable device 101 may obtain the area 130 having a size that may include all of the locations of the one or more data sets 125-1, 125-2, and 125-3 with respect to the visual object 120. In terms of being the area for selecting the visual object 120, the area 130 may be referred to as a selection area or an effective area.

For example, the size of the area 130 set by the wearable device 101 may be changed according to the accuracy and/or the precision of the gaze data 125. The size of the area 130 may decrease as the accuracy and/or the precision of the gaze data 125 increases. For example, in a state 128-1, in case that the wearable device 101 obtains the gaze data 125 for the visual object 120, the wearable device 101 may obtain an area 130-1 having a size smaller than the size of the area 130. The difference (e.g., accuracy) between the location of the visual object 120 obtained in the state 128-1 and the location of the gaze data 125 may be smaller than the difference 127 obtained in a state 128. The locations of the one or more data sets obtained in the state 128-1 may be spread out in a range smaller than the locations of the one or more data sets obtained in the state 128. In other words, the precision of the gaze data 125 obtained in the state 128-1 may be higher than the precision of the gaze data 125 obtained in the state 128. The wearable device 101 may set the area 130-1 having a size smaller than the area 130 as the area for selecting the visual object 120 based on the accuracy and/or the precision having a relatively high value in the state 128-1. For example, the wearable device 101 may set the area 130 having a first size based on a first difference between the location of the visual object 120 and the location of the gaze data 125. In the state 128-1, the wearable device 101 may set the area 130-1 having a second size based on a second difference between the location of the visual object 120 and the location of the gaze data 125. The second difference may be shorter than the first difference. The second size may be smaller than the first size.

For example, the wearable device 101 may set the area 130 for the visual object 120, which has a size set based on a parameter (e.g., a display brightness level) corresponding to the gaze data 125, based on the gaze data 125 obtained through the camera, in a state 128-2. The wearable device 101 may set an area 130-2 for the visual object 120 using the gaze data 125 obtained through the camera in another state 128-3 distinct from the state 128-2. The wearable device 101 may determine a size of the area for selecting the visual object 120 according to the accuracy and/or the precision of the gaze data 125 with respect to the visual object 120. The wearable device 101 may determine whether to identify the gaze data 125 as the user input for the visual object 120 based on the determined size. For example, the wearable device 101 may recognize the gaze data 125 as the user input for the visual object 120 based on identifying the gaze data 125 included in the area 130 for a specified time, in the state 128. The wearable device 101 may execute a function provided from the visual object 120 based on the gaze data 125 recognized as the user input. The wearable device 101 may identify an object (e.g., the real object, and/or the visual object) focused by the user, using the gaze data obtained through the camera. Based on identifying the focused object, the wearable device 101 may execute a function (e.g., gaze interaction) for interaction between the user and the focused object.

The accuracy and/or the precision of the gaze data 125 obtained through the camera by the wearable device 101 according to an embodiment may be changed according to the location of the visual object 120 displayed on the display. For example, in case that the wearable device 101 obtains gaze data for a visual object 120-1 displayed at a different location from the visual object 120 through the camera, the accuracy and/or the precision of the gaze data for the visual object 120-1 may become relatively less than the accuracy and/or the precision of the gaze data for the visual object 120. The visual object 120-1 may be displayed adjacent to an edge area 110-1 of the display (or the screen). For example, the wearable device 101 may adjust the size of the area for selecting the visual object 120 according to the location where the visual object 120 is displayed.

The wearable device 101 according to an embodiment may display the screen 110 on the display. While displaying the screen 110 on the display, the electronic device 101 may obtain the user's gaze data 125 related to the visual object 120 in the screen 110. The wearable device 101 may obtain the state information of the user related to the eye, using a camera disposed toward the user's eye. The operation of obtaining the state information will be described in greater detail below with reference to FIG. 4.

In case that the visual object (e.g., the visual object 120) is displayed at a first location (e.g., a center area) in the screen 110, the wearable device 101 according to an embodiment may determine whether to recognize the gaze data as the user input for the visual object 120, using the first area for the visual object 120 having a size set based on the state information.

For example, in case that the visual object (e.g., the visual object 120-1) is distinct from the first location in the screen 110 and displayed at a second location (e.g., the edge area 110-1) adjacent to at least one of edges of the screen 110, the wearable device 101 may determine whether to recognize the gaze data as a user input for the visual object 120-1 using a second area for the object having another size set based on the state information. For example, accuracy and/or precision of gaze data for the first location may differ from accuracy and/or precision of gaze data for the second location. The accuracy and/or the precision of the gaze data for the first location may be relatively higher than the accuracy and/or the precision of the gaze data for the second location. Since the accuracy and/or the precision of the gaze data for the first location may be relatively higher than the accuracy and/or the precision of the gaze data for the second location, the other size of the second area may be set to be larger than the size of the first area. In other words, the wearable device 101 may adjust the size of the area for selecting the visual object according to the location where the visual object is displayed on the screen 110.

As described above, the wearable device 101 according to an embodiment may determine whether to identify the user 105's gaze data 125 obtained through the camera as the user input for the visual object 120 included in the screen 110. Based on the location of the gaze data 125 with respect to the visual object 120, the wearable device 101 may adjust a size of the areas 130, 130-1, and 130-2 for determining whether to identify the gaze data 125 as the user input for the visual object 120. The wearable device 101 may change the number and/or size of visual objects to be included in the screen 110 to be suitable for the user 105 according to the adjusted size. The wearable device 101 may provide an optimized metaverse environment to the user 105, by changing the number and/or size of the visual objects to be included in the screen 110 to be suitable for the user 105.

Figure 2A:
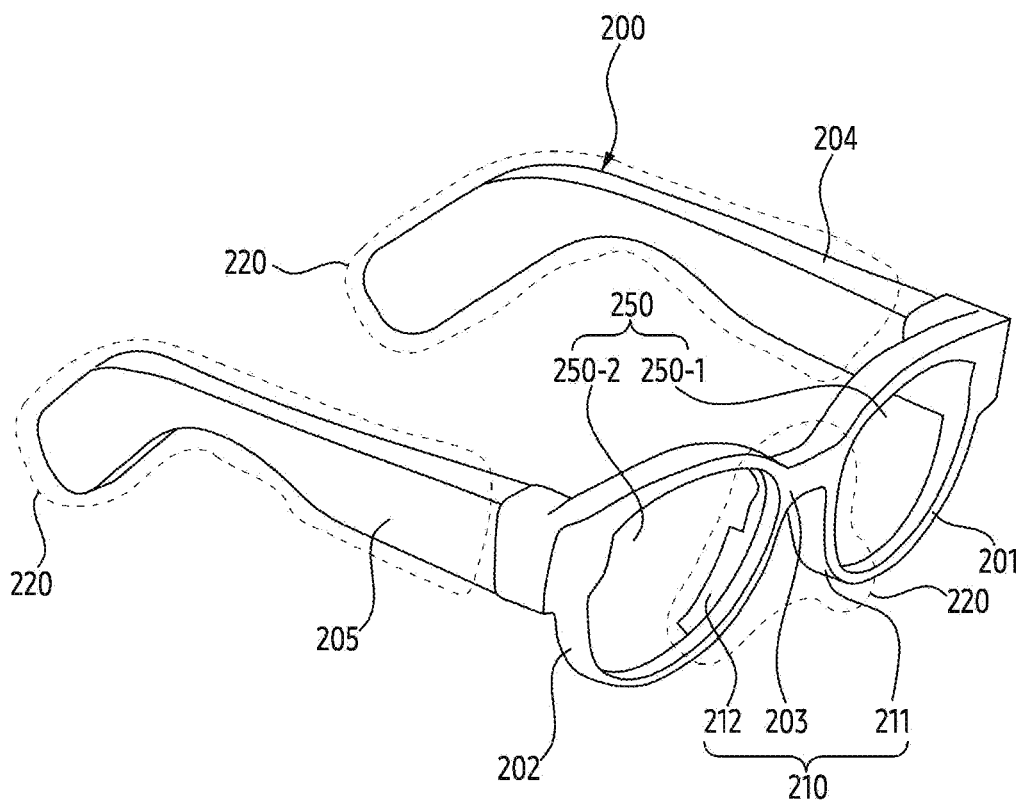
FIG. 2A is a perspective view of a wearable device according to various embodiments.
Figure 2B:
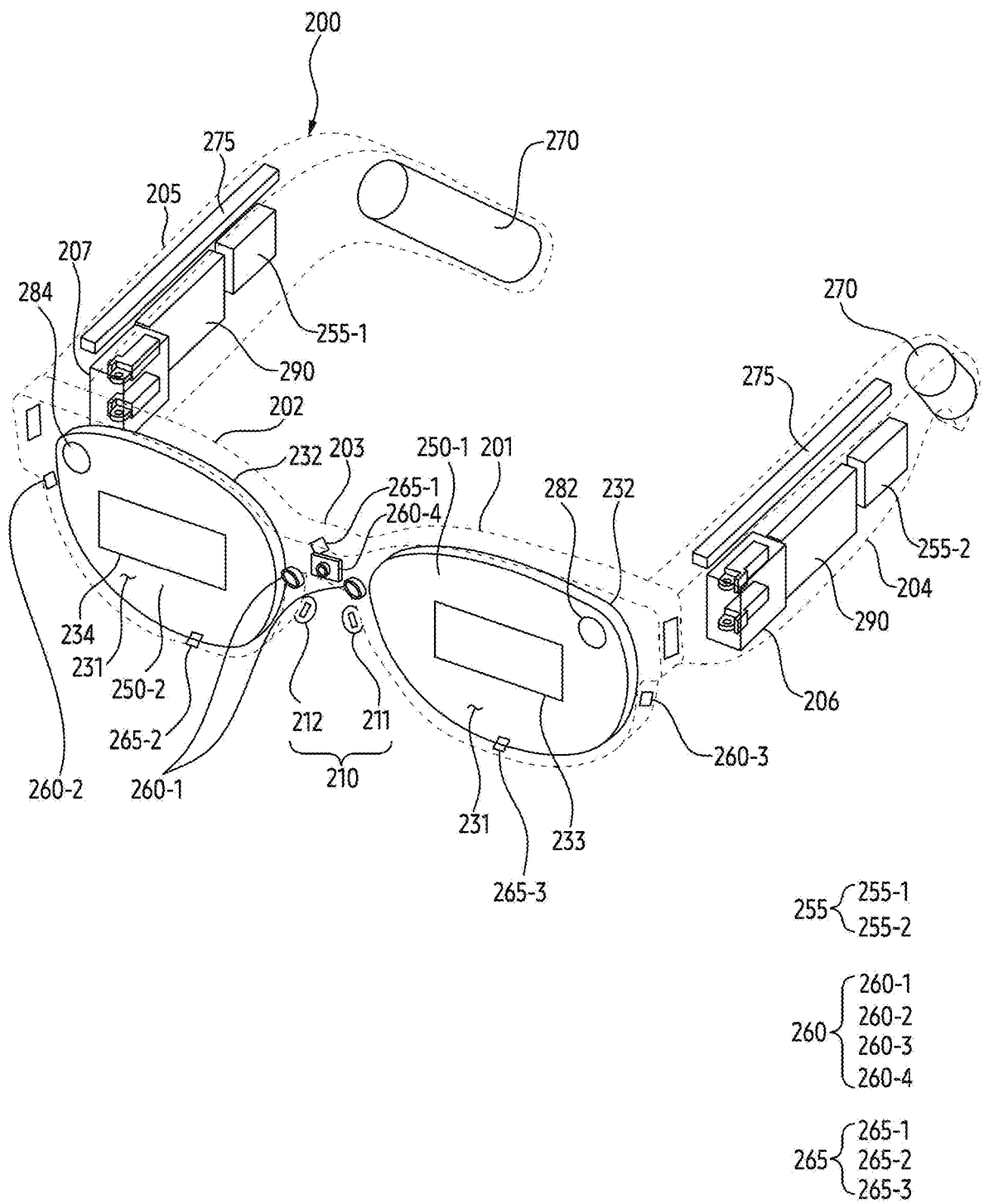
FIG. 2B is a perspective view illustrating one or more components disposed in a wearable device, according to various embodiments.

FIG. 2A is a perspective view illustrating an example wearable device according to various embodiments. FIG. 2B is a perspective view illustrating one or more components disposed in a wearable device, according to various embodiments. According to an embodiment, a wearable device 101 may have a form of glasses that are wearable on a user's body part (e.g., head). The wearable device 101 of FIGS. 2A to 2B may be an example of the wearable device 101 of FIG. 1. The wearable device 101 may include a head-mounted display (HMD). For example, a housing of the wearable device 101 may include a flexible material such as rubber and/or silicon having a form that closely adheres to a portion of the user's head (e.g., a portion of the face surrounding both eyes). For example, the housing of the wearable device 101 may include one or more straps that are able to be twined around the user's head and/or one or more temples that are attachable to the ears of the head.

Referring to FIG. 2A, according to an embodiment, the wearable device 101 may include at least one display 250 and a frame 200 supporting the at least one display 250.

According to an embodiment, the wearable device 101 may be worn on a portion of the user's body. The wearable device 101 may provide augmented reality (AR), virtual reality (VR), or mixed reality (MR) in which augmented reality and virtual reality are mixed, to the user wearing the wearable device 101. For example, the wearable device 101 may display a virtual reality image provided from at least one optical device 282 and 284 of FIG. 2B on the at least one display 250, in response to a user's designated gesture obtained through a motion recognition camera (or motion tracking camera) 260-2 and 260-3 of FIG. 2B.

According to an embodiment, the at least one display 250 may provide visual information to the user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at locations corresponding to the user's left and right eyes, respectively.

Referring to FIG. 2B, the at least one display 250 may provide visual information transmitted from ambient light and other visual information distinct from the visual information to the user through the lens included in the at least one display 250. The lens may be formed based on at least one of a fresnel lens, a pancake lens, or a multi-channel lens. For example, the at least one display 250 may include a first surface 231 and a second surface 232 opposite to the first surface 231. A display area may be formed on the second surface 232 of the at least one display 250. When the user wears the wearable device 101, the ambient light may be transmitted to the user by being incident on the first surface 231 and penetrated through the second surface 232. For another example, the at least one display 250 may display an augmented reality image in which the virtual reality image provided from the at least one optical device 282 and 284 is combined with a reality screen transmitted through the ambient light, on the display area formed on the second surface 232.

In an embodiment, the at least one display 250 may include at least one waveguide 233 and 234 that diffracts light transmitted from the at least one optical device 282 and 284 and transmits the diffracted light to the user. The at least one waveguide 233 and 234 may be formed based on at least one of glass, plastic, or polymer. A nano pattern may be formed on at least a portion of the outside or inside of the at least one waveguide 233 and 234. The nano pattern may be formed based on a grating structure having a shape of a polygon and/or a curved surface. Light incident to one end of the at least one waveguide 233 and 234 may be propagated to the other end of the at least one waveguide 233 and 234 by the nano pattern. The at least one waveguide 233 and 234 may include at least one of at least one diffractive element (e.g., a diffractive optical element (DOE), a holographic optical element (HOE)) or a reflective element (e.g., a reflective mirror). For example, the at least one waveguide 233 and 234 may be disposed in the wearable device 101 to guide a screen displayed by the at least one display 250 to the user's eyes. For example, the screen may be transmitted to the user's eyes based on total internal reflection (TIR) generated in the at least one waveguide 233 and 234.

The wearable device 101 may analyze an object included in a reality image collected through a photographing camera 260-4, combine a virtual object corresponding to an object that becomes a subject of augmented reality provision among the analyzed objects, and display it on the at least one display 250. The virtual object may include at least one of text and an image for various information associated with the object included in the reality image. The wearable device 101 may analyze the object based on a multi-camera such as a stereo camera. For the object analysis, the wearable device 101 may execute space recognition (e.g., simultaneous localization and mapping (SLAM) using the multi-camera and/or time-of-flight (ToF). The user wearing the wearable device 101 may watch the image displayed on the at least one display 250.

According to an embodiment, the frame 200 may be configured with a physical structure in which the wearable device 101 may be worn on the user's body. According to an embodiment, the frame 200 may be configured such that when the user wears the wearable device 101, the first display 250-1 and the second display 250-2 may be located at locations corresponding to the user's left and right eyes. The frame 200 may support the at least one display 250. For example, the frame 200 may support the first display 250-1 and the second display 250-2 to be located at locations corresponding to the user's left and right eyes.

Referring to FIG. 2A, the frame 200 may include an area 220 at least a portion of which is in contact with the portion of the user's body, in case that the user wears the wearable device 101. For example, the area 220 in contact with the portion of the user's body of the frame 200 may include an area in contact with a portion of a user's nose, a portion of a user's ear, and a portion of a side surface of a user's face, that the wearable device 101 contacts. According to an embodiment, the frame 200 may include a nose pad 210 that is contacted on the portion of the user's body. When the wearable device 101 is worn by the user, the nose pad 210 may be contacted on the portion of the user's nose. The frame 200 may include a first temple 204 and a second temple 205 that is contacted on another portion of the user's body that is distinct from the portion of the user's body.

For example, the frame 200 may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of the edge of the first rim 201 from one end of the bridge 203, a second pad 212 disposed along a portion of the edge of the second rim 202 from the other end of the bridge 203, the first temple 204 extending from the first rim 201 and fixed to a portion of the wearer's ear, and the second temple 205 extending from the second rim 202 and fixed to a portion of the ear opposite to the ear. The first pad 211 and the second pad 212 may be in contact with the portion of the user's nose, and the first temple 204 and the second temple 205 may be in contact with a portion of the user's face and the portion of the user's ear. The temples 204 and 205 may be rotatably connected to the rim through hinge units 206 and 207 of FIG. 2B. The first temple 204 may be rotatably connected with respect to the first rim 201 through the first hinge unit 206 disposed between the first rim 201 and the first temple 204. The second temple 205 may be rotatably connected with respect to the second rim 202 through the second hinge unit 207 disposed between the second rim 202 and the second temple 205. According to an embodiment, the wearable device 101 may identify an external object (e.g., a user's fingertip) touching the frame 200 and/or a gesture performed by the external object using a touch sensor, a grip sensor, and/or a proximity sensor formed on at least a portion of a surface of the frame 200.

According to an embodiment, the wearable device 101 may include hardware (e.g., hardware to be described in greater detail below based on the block diagram of FIG. 4) that performs various functions. For example, the hardware may include a battery module (e.g., including a battery) 270, an antenna module (e.g., including an antenna) 275, the at least one optical device 282 and 284, speakers (e.g., speakers 255-1 and 255-2), a microphone (e.g., microphones 265-1, 265-2, and 265-3), a light emitting module (not illustrated), and/or a printed circuit board (PCB) 290 (e.g., a printed circuit board). Various hardware may be disposed in the frame 200.

According to an embodiment, the microphone (e.g., the microphones 265-1, 265-2, and 265-3) of the wearable device 101 may obtain a sound signal, by being disposed on at least a portion of the frame 200. The first microphone 265-1 disposed on the bridge 203, the second microphone 265-2 disposed on the second rim 202, and the third microphone 265-3 disposed on the first rim 201 are illustrated in FIG. 2B, but the number and disposition of the microphones 265 are not limited to an embodiment of FIG. 2B. In case that the number of microphones 265 included in the wearable device 101 is two or more, the wearable device 101 may identify the direction of the sound signal using a plurality of microphones disposed on different portions of the frame 200.

According to an embodiment, the at least one optical device 282 and 284 may project the virtual object to the at least one display 250, in order to provide various image information to the user. For example, the at least one optical device 282 and 284 may be a projector. The at least one optical device 282 and 284 may be disposed adjacent to the at least one display 250 or may be included in the at least one display 250 as a portion of the at least one display 250. According to an embodiment, the wearable device 101 may include a first optical device 282 corresponding to the first display 250-1 and a second optical device 284 corresponding to the second display 250-2. For example, the at least one optical device 282 and 284 may include the first optical device 282 disposed at an edge of the first display 250-1 and the second optical device 284 disposed at an edge of the second display 250-2. The first optical device 282 may transmit light to the first waveguide 233 disposed on the first display 250-1, and the second optical device 284 may transmit light to the second waveguide 234 disposed on the second display 250-2.

In an embodiment, a camera 260 may include the photographing camera 260-4, an eye tracking camera (ET CAM) 260-1, and/or the motion recognition camera 260-2 and 260-3. The photographing camera 260-4, the eye tracking camera (ET CAM) 260-1, and the motion recognition camera 260-2 and 260-3 may be disposed at different locations on the frame 200 and may perform different functions. The eye tracking camera (ET CAM) 260-1 (e.g., an eye tracking camera 225-1 of FIG. 2) may output data indicating an eye location or the gaze of the user wearing the wearable device 101. For example, the wearable device 101 may detect the gaze from an image including a user's pupil obtained through the eye tracking camera (ET CAM) 260-1. The wearable device 101 may identify an object (e.g., a real object, and/or a virtual object) focused by the user using the user's gaze obtained through the eye tracking camera (ET CAM) 260-1. The wearable device 101 that identified the focused object may execute a function (e.g., gaze interaction) for interaction between the user and the focused object. The wearable device 101 may represent a portion corresponding to the eye of the avatar indicating the user in the virtual space using the user's gaze obtained through the eye tracking camera (ET CAM) 260-1. The wearable device 101 may render an image (or screen) displayed on the at least one display 250 based on the location of the user's eye. For example, visual quality of a first area related to the gaze (e.g., gaze 105 of FIG. 1) in the image and visual quality (e.g., resolution, brightness, saturation, grayscale, and pixels per inch (PPI)) of a second area distinct from the first area may be different from each other. The wearable device 101 may obtain an image (or screen) having the visual quality of the first area and the visual quality of the second area matching the user's gaze using foveated rendering. For example, in case that the wearable device 101 supports an iris recognition function, user authentication may be performed based on iris information obtained using the eye tracking camera (ET CAM) 260-1. An example in which the eye tracking camera (ET CAM) 260-1 is disposed toward both eyes of the user is illustrated in FIG. 2B, but the disclosure is not limited thereto, and the eye tracking camera (ET CAM) 860-1 may be disposed alone toward the user's left eye or right eye.

In an embodiment, the photographing camera 260-4 may photograph a real image or background to be matched with a virtual image in order to implement the augmented reality or mixed reality content. The photographing camera 260-4 may be used to obtain an image having a high resolution based on a high resolution (HR) or a photo video (PV). The photographing camera 260-4 may photograph an image of a specific object existing at a location viewed by the user and may provide the image to the at least one display 250. The at least one display 250 may display one image in which a virtual image provided through the at least one optical device 282 and 284 is overlapped with information on the real image or background including an image of the specific object obtained using the photographing camera 260-4. The wearable device 101 may compensate for depth information (e.g., a distance between the wearable device 101 and an external object obtained through a depth sensor) using an image obtained through the photographing camera 260-4. The wearable device 101 may perform object recognition through the image obtained using the photographing camera 260-4. The wearable device 101 may perform a function (e.g., auto focus) of focusing on an object (or subject) in the image using the photographing camera 260-4 and/or an optical image stabilization (OIS) function (e.g., an anti-shaking function). The wearable device 101 may perform a pass-through function for displaying an image obtained through the photographing camera 260-4 overlapping at least a portion of the screen, while displaying a screen indicating the virtual space on the at least one display 250. The photographing camera 260-4 may be referred to as a high resolution (HR) camera or a photo video (PV) camera. The photographing camera 260-4 may provide an auto focus (AF) function and an optical image stabilization (OIS) function. The photographing camera 260-4 may include a global shutter (GS) camera and/or a rolling shutter (RS) camera. In an embodiment, the photographing camera 260-4 may be disposed on the bridge 203 disposed between a first rim 201 and a second rim 202.

The eye tracking camera (ET CAM) 260-1 may implement a more realistic augmented reality by matching the user's gaze with the visual information provided on the at least one display 250 by tracking the gaze of the user wearing the wearable device 101. For example, when the user looks at the front, the wearable device 101 may naturally display environment information associated with the user's front on the at least one display 250 at the location where the user is located. The eye tracking camera (ET CAM) 260-1 may be configured to capture an image of the user's pupil in order to determine the user's gaze. For example, the eye tracking camera (ET CAM) 260-1 may receive gaze detection light reflected from the user's pupil and may track the user's gaze based on the location and movement of the received gaze detection light. In an embodiment, the eye tracking camera (ET CAM) 260-1 may be disposed at a location corresponding to the user's left and right eyes. For example, the eye tracking camera (ET CAM) 260-1 may be disposed in the first rim 201 and/or the second rim 202 to face the direction in which the user wearing the wearable device 101 is located.

The motion recognition camera 260-2 and 260-3 may provide a specific event to the screen provided on the at least one display 250 by recognizing the movement of the whole or portion of the user's body, such as the user's torso, hand, or face and the like. The motion recognition camera 260-2 and 260-3 may obtain a signal corresponding to the gesture by recognizing the user's gesture (gesture recognition), and may provide a display corresponding to the signal to the at least one display 250. The processor may identify a signal corresponding to the gesture and may perform a designated function based on the identification. The motion recognition camera 260-2 and 260-3 may be used to perform a space recognition function using SLAM and/or a depth map for 6 degrees of freedom pose (6 dof pose). The processor may perform a gesture recognition function and/or an object tracking function using the motion recognition camera 260-2 and 260-3. In an embodiment, the motion recognition camera 260-2 and 260-3 may be disposed on the first rim 201 and/or the second rim 202. The motion recognition camera 260-2 and 260-3 may include a global shutter (GS) camera (e.g., a global shutter (GS) camera) used for head tracking, hand tracking, and/or space recognition based on one of a 3 degrees of freedom pose or the 6 degrees of freedom pose. The GS camera may include two or more stereo cameras to track a fine movement. For example, the GS camera may be included in the eye tracking camera (ET CAM) 260-1 for tracking the user's gaze.

The camera 260 included in the wearable device 101 is not limited to the above-described eye tracking camera (ET CAM) 260-1 and the motion recognition camera 260-2 and 260-3. For example, the wearable device 101 may identify an external object included in the FoV using the camera disposed toward the user's FoV. That the wearable device 101 identifies the external object may be performed based on a sensor for identifying a distance between the wearable device 101 and the external object, such as a depth sensor and/or a time of flight (ToF) sensor. The camera 260 disposed toward the FoV may support an autofocus function and/or an optical image stabilization (OIS) function. For example, the wearable device 101 may include the camera 260 (e.g., a face tracking (FT) camera) disposed toward the face in order to obtain an image including the face of the user wearing the wearable device 101.

Although not illustrated, according to an embodiment, the wearable device 101 may further include a light source (e.g., LED) that emits light toward a subject (e.g., the user's eyes, face, and/or the external object in the FoV) photographed using the camera 260. The light source may include an LED having an infrared wavelength. The light source may be disposed on at least one of the frame 200, and the hinge units 206 and 207.

According to an embodiment, the battery module 270 may supply power to electronic components of the wearable device 101. In an embodiment, the battery module 270 may be disposed in the first temple 204 and/or the second temple 205. For example, the battery module 270 may be a plurality of battery modules 270. The plurality of battery modules 270, respectively, may be disposed on each of the first temple 204 and the second temple 205. In an embodiment, the battery module 270 may be disposed at an end of the first temple 204 and/or the second temple 205.

The antenna module 275 may transmit the signal or power to the outside of the wearable device 101 or may receive the signal or power from the outside. In an embodiment, the antenna module 275 may be disposed in the first temple 204 and/or the second temple 205. For example, the antenna module 275 may be disposed close to one surface of the first temple 204 and/or the second temple 205.

The speaker 255 may output a sound signal to the outside of the wearable device 101. A sound output module may be referred to as or include a speaker. In an embodiment, the speaker 255 may be disposed in the first temple 204 and/or the second temple 205 in order to be disposed adjacent to the ear of the user wearing the wearable device 101. For example, the speaker 255 may include the second speaker 255-2 disposed adjacent to the user's left ear by being disposed in the first temple 204, and the first speaker 255-1 disposed adjacent to the user's right ear by being disposed in the second temple 205.

The light emitting module (not illustrated) may include at least one light emitting element. The light emitting module may emit light of a color corresponding to a specific state or may emit light in an operation corresponding to the specific state in order to visually provide information on a specific state of the wearable device 101 to the user. For example, in case that the wearable device 101 needs charging, it may emit light which is red light at regular intervals. In an embodiment, the light emitting module may be disposed on the first rim 201 and/or the second rim 202.

Referring to FIG. 2B, according to an embodiment, the wearable device 101 may include the printed circuit board (PCB) 290. The PCB 290 may be included in at least one of the first temple 204 or the second temple 205. The PCB 290 may include an interposer disposed between at least two sub PCBs. On the PCB 290, one or more hardware (e.g., hardware illustrated by different blocks of FIG. 4) included in the wearable device 101 may be disposed. The wearable device 101 may include a flexible PCB (FPCB) for interconnecting the hardware.

According to an embodiment, the wearable device 101 may include at least one of a gyro sensor, a gravity sensor, and/or an acceleration sensor for detecting the posture of the wearable device 101 and/or the posture of a body part (e.g., a head) of the user wearing the wearable device 101. Each of the gravity sensor and the acceleration sensor may measure gravity acceleration, and/or acceleration based on designated 3 dimensional axes (e.g., x-axis, y-axis, and z-axis) perpendicular to each other. The gyro sensor may measure angular velocity of each of designated 3 dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 101 may identify the user's motion and/or gesture performed to execute or cease a specific function of the wearable device 101 based on the IMU.

Figure 3A:
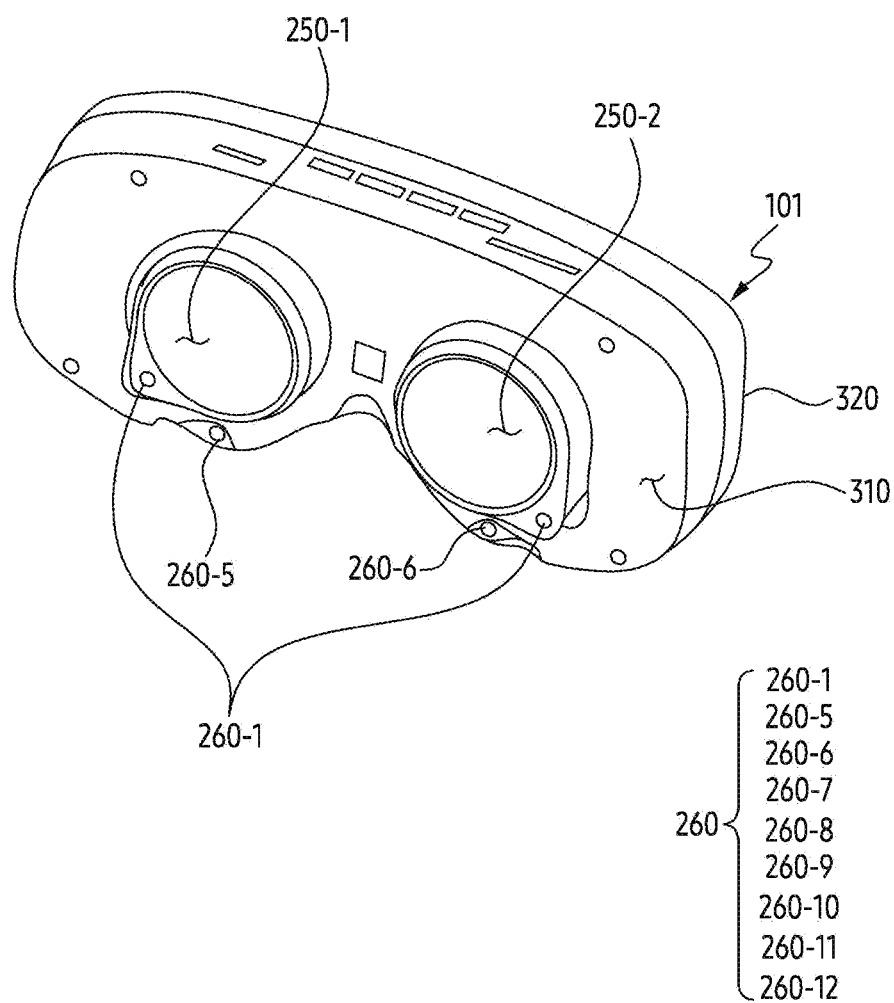
FIGS. 3A and 3B are perspective views illustrating an example of an exterior of a wearable device according to various embodiments.
Figure 3B:
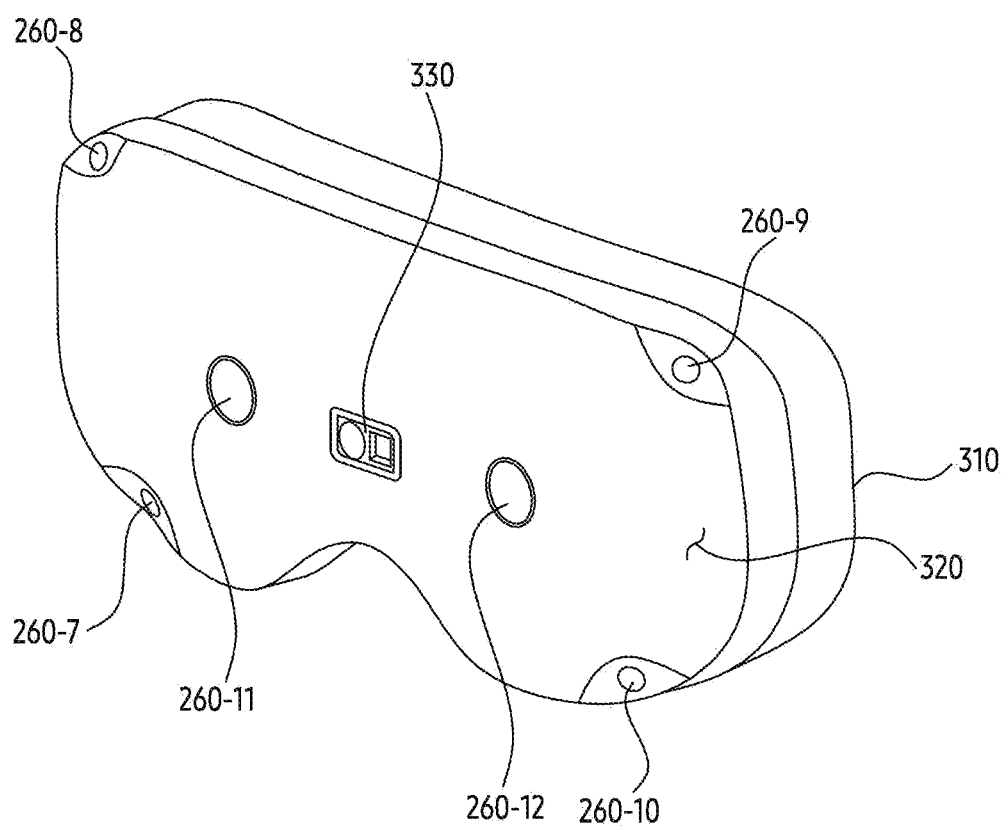

FIGS. 3A and 3B are perspective views illustrating an exterior of an example wearable device according to various embodiments. A wearable device 101 of FIGS. 3A to 3B may be an example of the wearable device 101 of FIG. 1. According to an embodiment, an example of exterior of a first surface 310 of a housing of the wearable device 101 may be illustrated in FIG. 3A, and an example of exterior of a second surface 320 opposite to the first surface 310 may be illustrated in FIG. 3B.

Referring to FIG. 3A, according to an embodiment, the first surface 310 of the wearable device 101 may have an attachable form on a user's body part (e.g., the user's face). Although not illustrated, the wearable device 101 may further include a strap for fixing on the user's body part and/or one or more temples (e.g., a first temple 204 and/or a second temple 205 of FIGS. 2A to 2B). A first display 250-1 for outputting an image to a left eye among both eyes of the user and a second display 250-2 for outputting an image to a right eye among both eyes may be disposed on the first surface 310. The wearable device 101 may further include rubber or silicon packing, which are formed on the first surface 310, for preventing and/or reducing interference by light (e.g., ambient light) different from the light emitted from the first display 250-1 and the second display 250-2.

According to an embodiment, the wearable device 101 may include cameras 260-1 for photographing and/or tracking both eyes of the user adjacent to each of the first display 250-1 and the second display 250-2. The cameras 260-1 may be referred to an eye tracking camera 260-1 of FIG. 2B. According to an embodiment, the wearable device 101 may include cameras 260-5 and 260-6 for photographing and/or recognizing the user's face. The cameras 260-5 and 260-6 may be referred to as FT cameras. The wearable device 101 may control an avatar representing the user in the virtual space based on a motion of the user's face identified using the cameras 260-5 and 260-6. For example, the wearable device 101 may change a texture and/or shape of a portion of the avatar (e.g., a portion of an avatar representing a person's face), using information obtained by cameras 260-5 and 260-6 (e.g., FT camera) and representing facial expression of a user wearing the wearable device 101.

Referring to FIG. 3B, a camera (e.g., cameras 260-7, 260-8, 260-9, 260-10, 260-11, and 260-12)) (e.g., a camera 440 of FIG. 4) for obtaining information related to an external environment of the wearable device 101, and/or a sensor (e.g., a depth sensor 330) may be disposed on the second surface 320 opposite to the first surface 310 of FIG. 3A. For example, the cameras 260-7, 260-8, 260-9, and 260-10 may be disposed on the second surface 320 to recognize an external object. The cameras 260-7, 260-8, 260-9, and 260-10 may be referred to the motion recognition camera 260-2 and 260-3 of FIG. 2B.

For example, using cameras 260-11 and 260-12, the wearable device 101 may obtain an image and/or video to be transmitted to each of both eyes of the user. The camera 260-11 may be disposed on the second surface 320 of the wearable device 101 to obtain an image to be displayed through the second display 250-2 corresponding to the right eye among both eyes. The camera 260-12 may be disposed on the second surface 320 of the wearable device 101 to obtain an image to be displayed through the first display 250-1 corresponding to the left eye among both eyes. For example, the wearable device 101 may obtain one screen using a plurality of images obtained through the cameras 260-11 and 260-12. The cameras 260-11 and 260-12 may be referred to the photographing camera 260-4 of FIG. 2B.

According to an embodiment, the wearable device 101 may include the depth sensor 330 disposed on the second surface 320 to identify the distance between the wearable device 101 and the external object. Using the depth sensor 330, the wearable device 101 may obtain spatial information (e.g., a depth map) for at least a portion of the FoV of the user wearing the wearable device 101. Although not illustrated, a microphone for obtaining sound outputted from the external object may be disposed on the second surface 320 of the wearable device 101. The number of microphones may be one or more according to the embodiment.

Hereinafter, a description of example hardware and/or software used by the wearable device 101 according to an embodiment to obtain gaze data (e.g., gaze data 125 of FIG. 1) will be described in greater detail with reference to FIG. 4.

Figure 4:
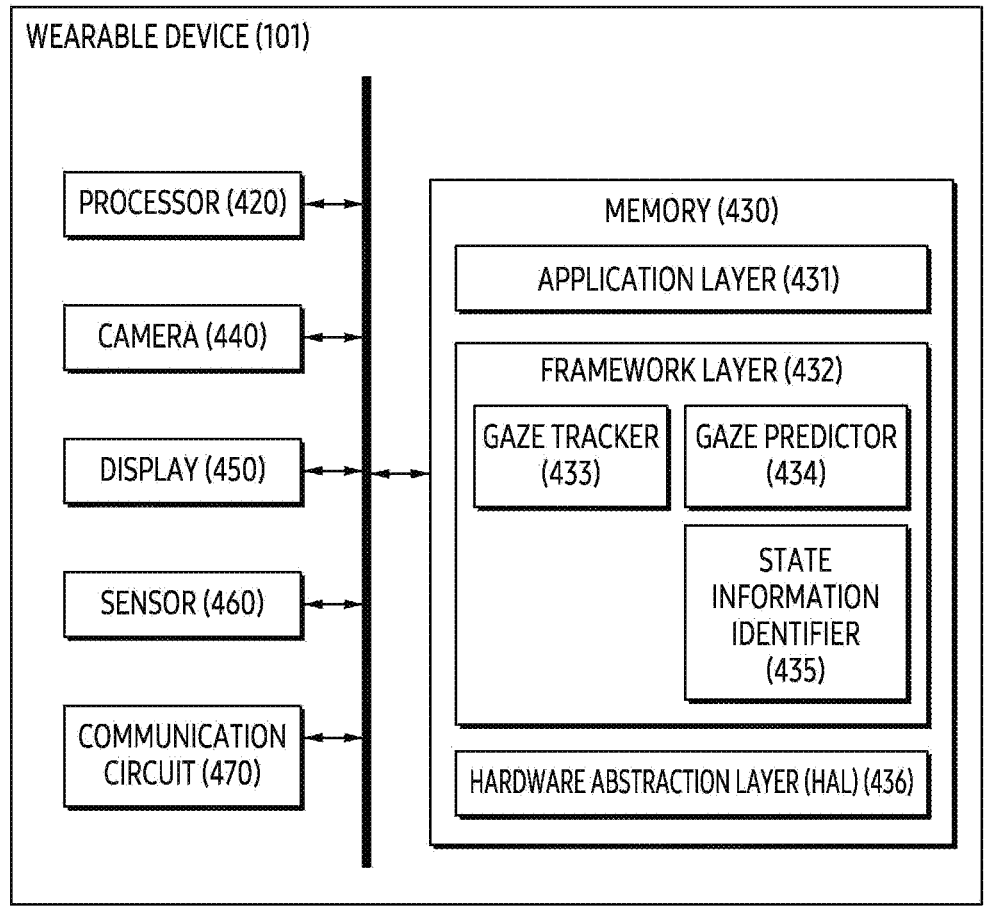
FIG. 4 is a block diagram illustrating an example configuration of a wearable device according to various embodiments.

FIG. 4 is a block diagram illustrating an example configuration of a wearable device according to various embodiments. A wearable device 101 of FIG. 4 may include the wearable device 101 of FIGS. 1 to 3B. Referring to FIG. 4, according to an embodiment, the wearable device 101 may include at least one of a processor (e.g., including processing circuitry) 420, a memory 430, a camera 440 (e.g., the camera 260 of FIGS. 2A to 3B), a display 450, a sensor 460, and/or a communication circuit 470. The processor 420, the memory 430, the camera 440, the display 450, the sensor 460, and the communication circuit 470 may be electronically and/or operably coupled with each other by an electronical component such as a communication bus. Hereinafter, an operably coupling of hardware components may refer, for example, to a direct connection or an indirect connection between hardware components being established by wire or wirelessly so that the second hardware component is controlled by the first hardware component among the hardware components. Although illustrated based on different blocks, the disclosure is not limited thereto, and a portion (e.g., at least a portion of the processor 420, the memory 430, and the communication circuit 470) of the hardware components illustrated in FIG. 4 may be included in a single integrated circuit, such as a system on a chip (SoC). A type and/or number of the hardware components included in the wearable device 101 is not limited as illustrated in FIG. 4. For example, the wearable device 101 may include only a portion of the hardware component illustrated in FIG. 4. Elements (e.g., layers and/or modules) in memory described below may be in a logically divided state. The elements in the memory may be included in a hardware component that is distinct from the memory. An operation performed by the processor 420 using each of the elements in the memory is an embodiment, and the processor 420 may perform an operation different from the operation through at least one element among the elements in the memory.

According to an embodiment, the processor 420 of the wearable device 101 may include a hardware component for processing data based on one or more instructions. The hardware component for processing data may include, for example, an arithmetic and logic unit (ALU), a floating point unit (FPU), a field programmable gate array (FPGA), and/or a central processing unit (CPU). The number of the processors 420 may be one or more. For example, the processor 420 may have a structure of a multi-core processor such as a dual core, a quad core, a hexa core, and/or an octa core. The processor 420 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the memory 430 of the wearable device 101 may include a hardware component for storing data and/or an instruction inputted to the processor 420 or outputted from the processor 420. The memory 430 may include, for example, volatile memory such as random-access memory (RAM) and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of programmable ROM (PROM), erasable PROM (EPROM), electrically erasable PROM (EEPROM), flash memory, hard disk, compact disk, and embedded multi media card (eMMC).

In an embodiment, the camera 440 of the wearable device 101 may include one or more optical sensors (e.g., a charged coupled device (CCD) sensor, a complementary metal oxide semiconductor (CMOS) sensor) that generate an electrical signal indicating a color and/or brightness of the light. The camera 440 may be referred to as an image sensor. For example, the camera 440 may be included in the sensor 460 in terms of being referred to as an image sensor. A plurality of optical sensors included in the camera 440 may be arranged in the form of a 2 dimensional array. The camera 440 may generate an image corresponding to light reaching the optical sensors of the 2 dimensional array and including a plurality of pixels arranged in 2 dimensions, by obtaining electrical a signal of each of the plurality of optical sensors substantially simultaneously. For example, photo data captured using the camera 440 may refer, for example, to one image obtained from the camera 440. For example, video data captured using the camera 440 may refer, for example, to a sequence of a plurality of images obtained from the camera 440 according to a designated frame rate. As described above in FIGS. 2A to 3B, the camera 440 may be one or more. For example, the camera 440 may be disposed toward the user's eye, for data indicating a location of the eye, a direction of the eye, and/or gaze of the user wearing the wearable device 101. The camera 440 may include an eye tracking camera 260-1 of FIG. 2B. The camera 440 may be disposed toward a direction in which the camera 440 receives the light and may further include a flash light for outputting the light toward the direction.

According to an embodiment, the display 450 of the wearable device 101 may output visualized information (e.g., a screen 110 of FIG. 1) to the user. The number of displays 450 included in the wearable device 101 may be one or more. For example, the display 450 may output the visualized information to the user, by being controlled by the processor 420 and/or a graphic processing unit (GPU). The display 450 may include a flat panel display (FPD) and/or electronic paper. The FPD may include a liquid crystal display (LCD), a plasma display panel (PDP), a digital mirror device (DMD), one or more light emitting diodes (LEDs), and/or a micro LED. The LED may include an organic LED (OLED). The disclosure is not limited thereto, and for example, in case that the wearable device 101 includes a lens for penetrating external light or ambient light, the display 450 may include a projector (or projection assembly) for projecting light onto the lens. In an embodiment, the display 450 may be referred to as a display panel and/or display module.

In an embodiment, penetration of light may occur in at least a portion of the display 450. The wearable device 101 may provide a user experience related to augmented reality by providing a combination of light outputted through the display 450 and light penetrating the display 450 to the user. As described above with reference to FIGS. 2A to 2B and/or 3A to 3B, according to an embodiment, the display 450 of the wearable device 101 may have a structure for covering the entire field-of-view (FoV) of the user or emitting light toward the FoV, in a state of being worn on the user's body part such as the head.

The sensor 460 of the wearable device 101 according to an embodiment may generate electronic information that may be processed by the processor 420 and/or the memory 430 from non-electronic information related to the wearable device 101. The information may be referred to as sensor data. The electronic information generated by the sensor 460 may be stored in the memory 430, processed by the processor 420, or transmitted to another electronic device distinct from the wearable device 101. For example, the sensor 460 may include a grip sensor capable of identifying contact between the wearable device 101 and an external object (e.g., the user), a gyro sensor or acceleration sensor capable of identifying the movement of the wearable device 101, a global positioning system (GPS) sensor for detecting the geographic location of the wearable device 101, and/or an illuminance sensor capable of identifying ambient light of the wearable device 101.

In an embodiment, the sensor 460 may include an image sensor, an audio sensor (e.g., a microphone array including a microphone and/or a plurality of microphones), and/or a time-of-flight (ToF) sensor (or ToF camera).

In an embodiment, the sensor 460 may include an inertial measurement unit (IMU) for detecting a physical motion of the wearable device 101. An acceleration sensor, a geomagnetic sensor, a gravity sensor, or any combination thereof may be referred to as the IMU. The acceleration sensor may output an electrical signal indicating gravitational acceleration and/or acceleration of each of a plurality of axes (e.g., x-axis, y-axis, and z-axis), which are perpendicular to each other and based on the designated origin of the wearable device 101. The gyro sensor may output an electrical signal indicating angular velocities (e.g., roll, pitch, and/or yaw) of the plurality of axes. The gyro sensor may be referred to as an angular velocity sensor. The geomagnetic sensor may output an electrical signal indicating a size of a magnetic field formed in the wearable device 101 along each of the plurality of axes (e.g., x-axis, y-axis, and/or z-axis). For example, the acceleration sensor, the gyro sensor, and/or the geomagnetic sensor may repeatedly output sensor data including accelerations, angular velocities, and/or sizes of the magnetic field of the number of the plurality of axes based on a designated period (e.g., 1 millisecond).

For example, the illuminance sensor may output an electrical signal indicating the intensity (or amount of light) of light reaching at least a portion of the illuminance sensor exposed to the outside. For example, the illuminance sensor may output sensor data indicating the brightness of the ambient light of the wearable device 101. The illuminance sensor may include an element having a photoelectric effect in which electrons are generated and conductivity changes when receiving the ambient light. The illuminance sensor may be an example of a CdS sensor that uses cadmium sulfide as the element. The wearable device 101 may adjust an overall brightness level of the display based on the intensity of light using the illuminance sensor. The wearable device 101 may identify a change in the size of the pupil based on the illuminance level indicating the intensity of the ambient light obtained through the illuminance sensor. The wearable device 101 may obtain user's gaze data through an image indicating the pupil having the changed size. The wearable device 101 may determine whether to identify the obtained gaze data as a user input for an object (e.g., a visual object 120 of FIG. 1) displayed on the display 450. An operation of determining whether to identify the gaze data as the user input will be described in greater detail below with reference to FIGS. 5 to 9.

In an embodiment, the communication circuit 470 of the wearable device 101 may include a circuit for supporting transmission and/or reception of an electrical signal between the wearable device 101 and an external electronic device. The communication circuit 235 may include at least one of, for example, a modem (MODEM), an antenna, and an optic/electronic (O/E) converter. The communication circuit 470 may support the transmission and/or reception of the electrical signal based on various types of protocols such as ethernet and local area network (LAN), wide area network (WAN), wireless fidelity (WiFi), Bluetooth, bluetooth low energy (BLE), ZigBee, long term evolution (LTE), and 5G new radio (NR). In an embodiment, the communication circuit 235 may be referred to as a communication processor and/or a communication module.

According to an embodiment, in the memory 430 of the wearable device 101, data to be processed by the processor 420 and one or more instructions indicating a calculation and/or an operation to be performed may be stored. The set of the one or more instructions may be referred to as a firmware, operating system, process, routine, sub-routine and/or software application. For example, the wearable device 101 and/or the processor 420 may perform at least one of the operations of FIG. 5 to 9 or 12 to 14 described in greater detail below when a set of a plurality of instructions distributed in a form of an operating system, firmware, driver, program, and/or application is executed. Hereinafter, that the application is installed in the wearable device 101 may refer, for example, to one or more instructions provided in a form of an application being stored in the memory 430 of the wearable device 101, and the one or more applications are stored in an executable format (e.g., a file having an extension designated by the operating system of the wearable device 101) by the processor 210 of the wearable device 101. For example, the application may include a program and/or a library associated with a service provided to the user.

Referring to FIG. 4, programs installed in the wearable device 101 may be classified into any one layer among different layers including an application layer 431, a framework layer 432, and/or a hardware abstraction layer (HAL)

436 based on a target. For example, programs (e.g., a module, or a driver) designed to target the hardware (e.g., the display 450, the camera 440, and/or the sensor 460) of the wearable device 101 may be classified in the hardware abstraction layer (HAL) 436. The framework layer 432 may be referred to as an XR framework layer, in terms of including one or more programs for providing an extended reality (XR) service. For example, the layers illustrated in FIG. 4 are logically (or for convenience of explanation) divided and may not require that an address space of the memory 430 is divided by the layers.

For example, programs (e.g., a gaze tracker 433, a gaze predictor 434, and/or a state information identifier 435, each of which may include various executable program instructions) designed to target at least one of the hardware abstraction layer (HAL) 436 and/or the application layer 431 may be classified in the framework layer 432. The programs classified as the framework layer 432 may provide an application programming interface (API) that may be executed (or invoked or called) based on another program.

According to an embodiment, the framework layer 432 may include one or more programs for processing data obtained from the sensor 460 and/or the camera 440. The one or more programs may include at least one of the gaze tracker 433, the gaze predictor 434, and/or the state information identifier 435. The type and/or number of one or more programs included in the framework layer 432 is not limited to that illustrated in FIG. 4.

For example, in the application layer 431, a program designed to target a user controlling the wearable device 101 may be classified. The programs (e.g., a software application) classified as the application layer 431 may cause execution of functions supported by the programs classified as the framework layer 432, by calling the application programming interface (API).

For example, the wearable device 101 may identify the gaze data indicating the gaze using an image related to the user's eyes obtained through the camera 440 in a state that the gaze tracker 433 is executed. The wearable device 101 may track the gaze based on identifying a location of the pupil and/or glint indicated by the image. Since the gaze data is identified through the image, it may be obtained based on parameters that may change the state of the user's eye (e.g., the size of the pupil). The parameters may include an entire brightness level of the display 450 disposed toward the user's eye, the illuminance level indicating the intensity of the ambient light identified through the illuminance sensor, and/or state information related to the eye.

For example, the wearable device 101 may identify the user's state information related to the user's eyes wearing the wearable device 101 based on execution of the state information identifier 435. The wearable device 101 may identify the state information using an image obtained through the camera 440. The state information may include data indicating whether the user wears glasses, data indicating whether the user wears contact lenses, data indicating the size of the eye, data indicating a thickness of the user's eyelids, or a combination thereof. For example, the wearable device 101 may identify a distance (e.g., eye relief) between the wearable device 101 and the user's eyes through the state information identifier 435. The wearable device 101 may identify a wearing state worn by the user of the wearable device 101. The wearing state may include a state in which the wearable device 101 slips from a part of the user (e.g., eyes, or nose) and/or a state in which the wearable device 101 is worn slantingly. However, the disclosure is not limited to the above-described embodiments.

For example, the wearable device 101 may predict (or infer) the user's gaze through the gaze predictor 434, using the user's state information obtained based on the state information identifier 435 (or environment classification module). Based on the gaze data indicating the gaze predicted through the gaze predictor 434, the wearable device 101 may set a size of areas (e.g., areas 130, 130-1, and 130-2 of FIG. 1) for selecting an object matching the gaze data. The wearable device 101 may determine whether to recognize the gaze data as a user input for selecting the object using the area. For example, the wearable device 101 may obtain a user input for determining whether to infer the gaze data through the gaze predictor 434 or to identify the gaze data through the gaze tracker 433. The wearable device 101 may obtain the gaze data using the gaze predictor 434 and/or the gaze tracker 433 based on the user input. However, the disclosure is not limited to the above-described embodiments. For example, the wearable device 101 may bypass an operation of identifying the gaze data through the gaze tracker 433 and may infer the gaze data according to the state information using the gaze predictor 434.

As described above, the wearable device 101 according to an embodiment may directly obtain the gaze data by analyzing an image related to the eye obtained through the camera 440. The wearable device 101 may indirectly infer the gaze data using the user's state information related to the eyes. The wearable device 101 may determine whether the gaze data is the user input for selecting the object using the obtained gaze data and/or the inferred gaze data.

Hereinafter, an example of an operation in which the wearable device 101 according to an embodiment obtains the gaze data indicating the user input using one or more parameters related to the eye will be described in greater detail with reference to FIG. 5.

Figure 5:
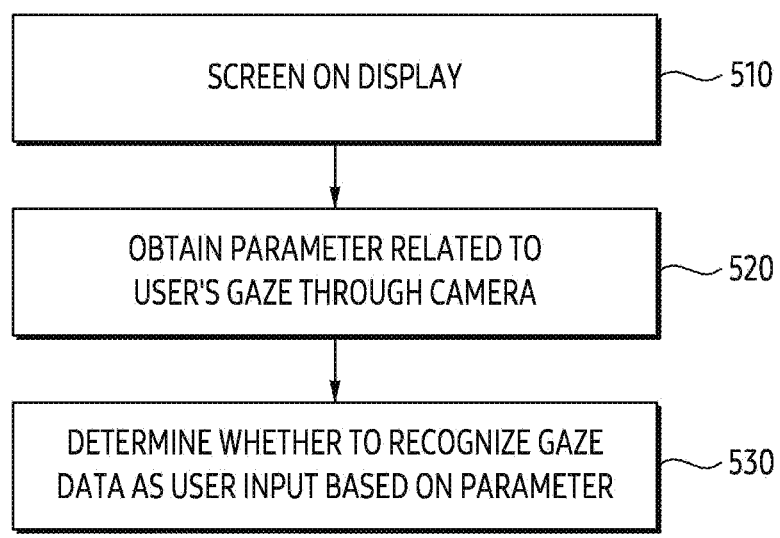
FIG. 5 is a flowchart indicating an operation of a wearable device according to an embodiment.

FIG. 5 is a flowchart illustrating an example operation of a wearable device according to various embodiments. The wearable device of FIG. 5 may include a wearable device 101 of FIGS. 1 to 4. At least one of the operations of FIG. 5 may be performed by the wearable device 101 of FIG. 1. At least one of the operations of FIG. 5 may be controlled by a processor 420 of FIG. 4. Each of the operations of FIG. 5 may be performed sequentially, but is not necessarily performed sequentially. For example, an order of each of the operations may be changed, and at least two operations may be performed in parallel.

Referring to FIG. 5, in operation 510, a processor according to an embodiment may control the wearable device to display a screen on a display. The screen may include a screen 110 of FIG. 1. The display may be one or more in terms of corresponding to both eyes of a user. The screen may include one or more objects.

Referring to FIG. 5, in operation 520, the processor according to an embodiment may obtain a parameter related to a user's gaze through a camera. Using the parameter related to the gaze (or eye), the processor may obtain the user's gaze data. The parameter may indicate overall screen brightness of the display, illuminance indicating intensity of ambient light, a wearing state of the wearable device, and/or a state related to the user's eyes. The processor may obtain the gaze data on at least one object included in the screen using the parameter. The processor may infer information indicating accuracy and/or precision of gaze data for the object, using the parameter. For example, the processor may obtain gaze data (or the accuracy and/or the precision of the gaze data) corresponding to the parameter, through a neural network trained to infer the gaze data, using the parameter. The neural network may include a neural network trained to obtain the user's state information in various environments and predict the accuracy and/or the precision of the gaze data based on the obtained state information. The various environments may include environments having different a brightness level and/or an illuminance level of the display.

Referring to FIG. 5, in operation 530, the processor according to an embodiment may determine whether to recognize the gaze data as an input (e.g., a user input) based on the parameter. The processor may identify whether the gaze data indicates a user input for selecting at least one object, based on the information indicating the accuracy and/or the precision of the gaze data.

For example, the processor may set an area for selecting at least one object based on the information indicating the accuracy and/or the precision of the gaze data. The processor may determine a size of area (e.g., areas 130, 130-1, and 130-2 of FIG. 1) based on the information indicating the accuracy and/or the precision of the gaze data. The processor may identify the gaze data as the user input for selecting at least one object using the area having the determined size. The processor may execute a function provided from at least one object based on the gaze data recognized as the user input. In case that the gaze data is not recognized as the user input, the processor may not execute a function provided from at least one object.

Hereinafter, an example of an operation of identifying the gaze data as the user input using a parameter indicating the brightness of the display will be described in greater detail with reference to FIG. 6.

Figure 6:
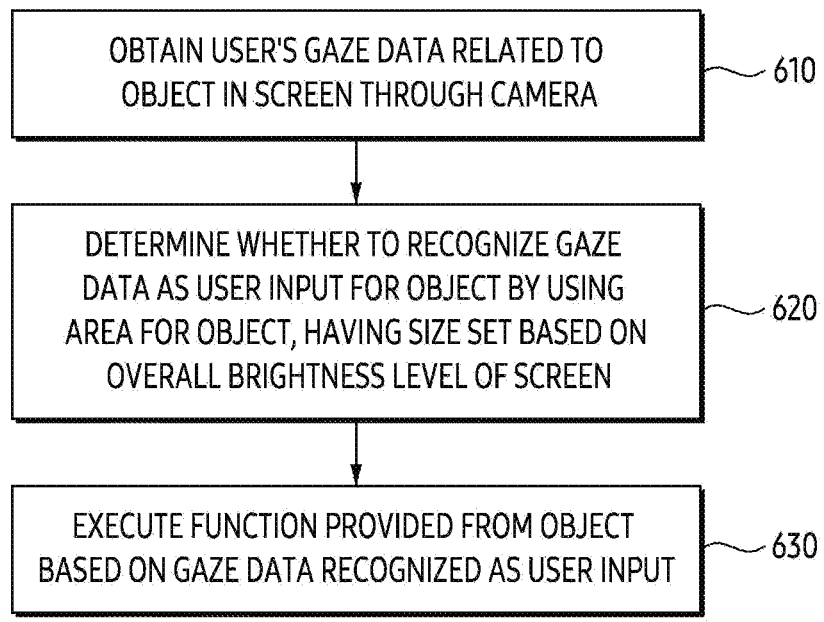
FIG. 6 is a flowchart illustrating an example operation of using a brightness level of a wearable device according to various embodiments.

FIG. 6 is a flowchart illustrating an example operation of using a brightness level of a wearable device according to various embodiments. The wearable device of FIG. 6 may include a wearable device 101 of FIGS. 1 to 4. At least one of the operations of FIG. 6 may be performed by the wearable device 101 of FIG. 1. At least one of the operations of FIG. 6 may be controlled by a processor 420 of FIG. 4. Each of the operations of FIG. 6 may be performed sequentially, but is not necessarily performed sequentially. For example, an order of each of the operations may be changed, and at least two operations may be performed in parallel. At least one of the operations of FIG. 6 may be related to at least one of operations of FIG. 5.

Referring to FIG. 6, in operation 610, a processor according to an embodiment may obtain user's gaze data related to an object in a screen through a camera. For example, the processor may obtain a parameter related to the gaze based on execution of a state information identifier 435 of FIG. 4. The processor may predict (or infer) the gaze data (e.g., gaze data 125 of FIG. 1) of the user (e.g., a user 105 of FIG. 1) for the object (e.g., a visual object 120 of FIG. 1) in the screen (e.g., a screen 110 of FIG. 1) using the image obtained through the camera.

Referring to FIG. 6, in operation 620, the processor according to an embodiment may determine whether to recognize the gaze data as a user input for the object using an area for the object, having a size set based on an overall brightness level of the screen.

For example, the processor may determine whether to identify the gaze data as the user input according to the overall brightness level of the screen. The processor may infer accuracy and/or precision of the gaze data obtained through the camera using the overall brightness level (e.g., a parameter indicating the brightness level) of the screen. The processor may determine whether to recognize the gaze data as the user input based on the accuracy and/or the precision of the inferred gaze data. For example, based on the overall brightness level of the screen in a processor reference range, gaze data located outside the object may be recognized as the user input. The processor may determine that the gaze data located outside the object is not recognized as the user input based on an overall brightness level of a screen outside the reference range.

For example, the processor may determine a size of the area using a parameter indicating the overall brightness level of the screen. The processor may determine the size of the area indicating a range in which a user input for selecting an object included in the screen is to be obtained. For example, the processor may identify the size of the pupil that changes according to a brightness level of a screen displayed on a display disposed toward an eye, through the camera. The processor may infer the accuracy and/or the precision of the gaze data according to the changed size of the pupil.

For example, the processor may set the size of the area to a first size, based on the overall brightness level of the screen in the reference range. The processor may set the size of the area to a second size greater than the first size, based on the overall brightness level of the screen outside the reference range. The accuracy and/or the precision of the gaze data used to set the size of the area to the second size may be lower than the accuracy and/or the precision of the gaze data used to set the size of the area to the first size. For example, in case that the screen is displayed based on the overall brightness level of the display outside the reference range, the size of the user's pupil may be reduced. The accuracy and/or the precision of the gaze data obtained using the pupil having the reduced size may be lower than accuracy and/or precision of gaze data obtained using a pupil having another size (a size obtained based on the overall brightness level of the screen in the reference range). For example, since the overall brightness level in the reference range is higher than the overall brightness level outside the reference range, the processor may more accurately infer the gaze data related to the eye using the image through the camera. For example, the area having the second size may be referred to an area 130-1 of FIG. 1, and the area having the first size may be referred to an area 130 of FIG. 1. However, the disclosure is not limited thereto. For example, the processor may set a length of a specified time for selecting the object independently of determining the size of the area.

For example, the processor may determine whether to recognize the gaze data as the user input by checking whether a location indicated by the gaze data is located in the area (e.g., the areas 130, 130-1, 130-2 of FIG. 1). For example, the processor may recognize the gaze data as the user input in response to the location in the area for the specified time. For example, the processor may determine not to recognize the gaze data as the user input in response to the location outside the area.

For example, the processor may display an object having the second size corresponding to the first size of the area in the screen. The processor may display an object having the second size mapped from the first size on the screen. The processor may identify the second size of the object using the first size of the area indicated by the gaze data. The processor may adjust the number of one or more objects to be displayed on the display based on identifying the second size. An example of an operation in which the processor adjusts the number of one or more objects according to the second size will be described in greater detail below with reference to FIG. 10.

Referring to FIG. 6, in operation 630, the processor according to an embodiment may execute a function provided from the object based on the gaze data recognized as the user input. In case that the location indicated by the gaze data in the area is included for the specified time, the processor may execute the function provided from the object. The processor may display a visual effect for indicating the specified time on the display. For example, the processor may maintain disabling the function provided from the object based on the location outside the area. An operation in which the processor displays the visual effect on the display will be described in greater detail below with reference to FIG. 11.

Hereinafter, an example of an operation in which the processor according to an embodiment recognizes the gaze data as the user input using a parameter different from the parameter indicating the overall brightness level of the screen will be described in greater detail with reference to FIG. 7.

Figure 7:
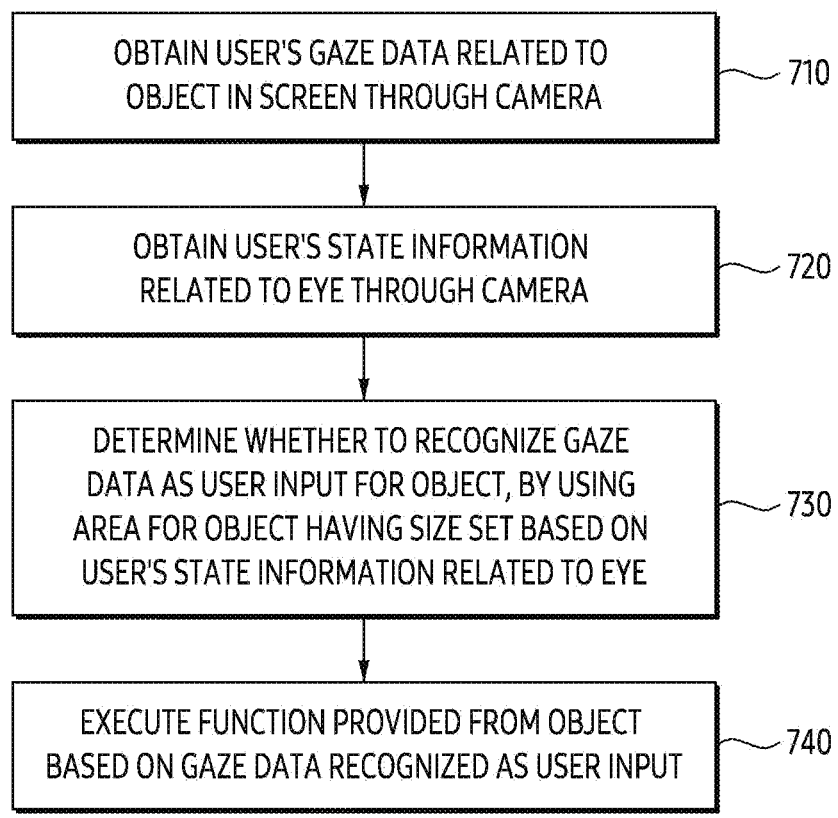
FIG. 7 is a flowchart illustrating an example operation of using state information of a user of a wearable device according to various embodiments.

FIG. 7 is a flowchart illustrating an example operation of using state information of a user of a wearable device according to various embodiments. The wearable device of FIG. 7 may include a wearable device 101 of FIGS. 1 to 4. At least one of the operations of FIG. 7 may be performed by the wearable device 101 of FIG. 1. At least one of the operations of FIG. 7 may be controlled by a processor 420 of FIG. 4. Each of the operations of FIG. 7 may be performed sequentially, but is not necessarily performed sequentially. For example, an order of each of the operations may be changed, and at least two operations may be performed in parallel. At least one of the operations of FIG. 7 may be related to at least one of operations of FIG. 7.

Referring to FIG. 7, in operation 710, a processor according to an embodiment may obtain user's gaze data related to an object in a screen through a camera. The processor may identify user's state information related to an eye using an image, and may infer gaze data using the identified state information. The operation 710 may be referred to operation 610.

Referring to FIG. 7, in operation 720, the processor according to an embodiment may obtain the user's state information related to the eye through the camera. The processor may infer gaze data on the object in the screen using a brightness level of the screen and/or the user's state information through the camera. For example, despite a size of an area (e.g., an area 130 of FIG. 1) having a first size corresponding to the overall brightness level of the screen, it may set an area having a second size (e.g., a size of an area 130-1 of FIG. 1) by further using the state information. However, the disclosure is not limited thereto.

For example, the processor may infer the gaze data for the object using the overall brightness level of the screen and/or data indicating whether the user wears glasses. Since accuracy may vary according to whether the user wears glasses, the processor may determine whether to identify the gaze data as a user input for the object, using the overall brightness level of the screen and/or the data indicating whether the user wears glasses. However, the disclosure is not limited thereto. For example, the processor may determine whether to identify the gaze data obtained based on the overall brightness level of the screen, data indicating whether the user wears contact lenses, data indicating a size of the user's eyes, data indicating a thickness of the user's eyelids, or a combination thereof, as the user input for the object. The processor may set the size of the area for the object in order to determine whether to identify the gaze data as the user input for the object. The processor may set the size of the area for the object using the accuracy and/or precision of the gaze data inferred based on the overall brightness level of the screen and/or the user's state information.

Referring to FIG. 7, in operation 730, the processor according to an embodiment may determine whether to recognize the gaze data as the user input for the object, using an area for an object having the size set based on the user's state information related to the eye.

For example, the processor may identify the user's state information using the camera in a state of identifying the overall brightness level of the screen. In the state, the processor may infer the accuracy and/or the precision of the gaze data identified through the camera based on the user's state information. In the state, the processor may set the size of the area using the inferred accuracy and/or precision, by inferring the accuracy and/or the precision indicating whether the gaze data indicating the user's gaze in the screen is accurate, using the user's state information.

For example, the processor may determine whether to recognize the gaze data as a user input for interacting with the object by checking whether a location indicated by the gaze data is located in the area. For example, the processor may recognize the gaze data as the user input in case that the location of the gaze data is included in the area for a specified time. For example, in case that the location of the gaze data is not included in the area, the processor may determine that the gaze data is not recognized as the user input.

Referring to FIG. 7, in operation 740, the processor according to an embodiment may execute a function provided from the object based on the gaze data recognized as the user input. The operation 740 may be related to operation 630.

Figure 8:
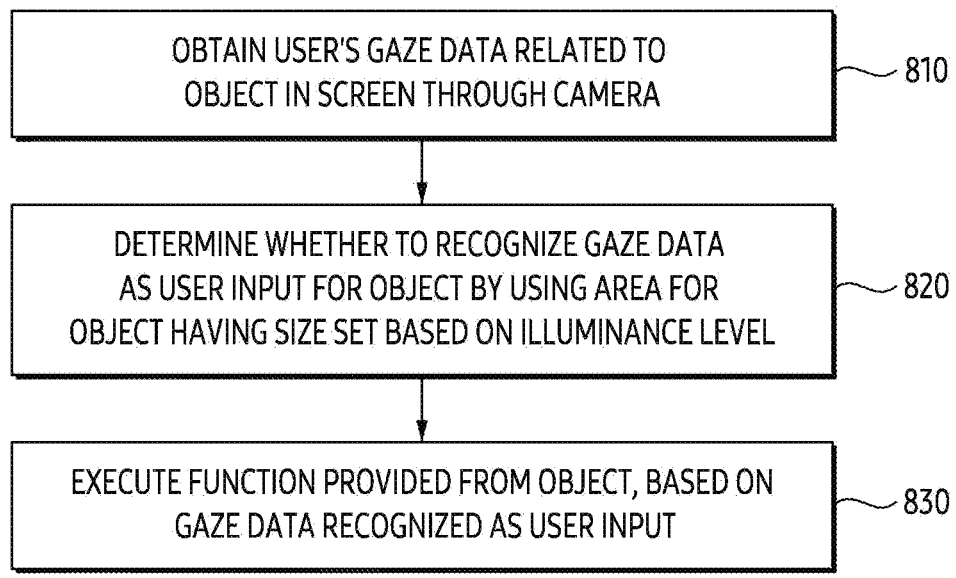
FIG. 8 is a flowchart illustrating an example operation of using an illuminance level of a wearable device according to various embodiments.

FIG. 8 is a flowchart illustrating an example operation of using an illuminance level of a wearable device according to various embodiments. The wearable device of FIG. 8 may include a wearable device 101 of FIGS. 1 to 4. At least one of the operations of FIG. 8 may be performed by the wearable device 101 of FIG. 1. At least one of the operations of FIG. 8 may be controlled by a processor 420 of FIG. 4. Each of the operations of FIG. 8 may be performed sequentially, but is not necessarily performed sequentially. For example, an order of each of the operations may be changed, and at least two operations may be performed in parallel. At least one of the operations of FIG. 8 may be related to at least one of the operations of FIG. 6.

Referring to FIG. 8, in operation 810, a processor according to an embodiment may obtain a user's gaze data related to an object in a screen through a camera. For example, the processor may obtain (or infer) gaze data based on the illuminance level using an illuminance sensor configured to obtain the illuminance level around the wearable device. The operation 810 may be related to operation 610 of FIG. 6.

Referring to FIG. 8, in operation 820, the processor according to an embodiment may determine whether to recognize the gaze data as the user input for the object using the area for the object having a size set based on the illuminance level.

For example, the processor may determine whether to identify the gaze data as the user input, according to the illuminance level. The processor may infer accuracy and/or precision of the gaze data obtained through the camera, using the illuminance level (e.g., a parameter indicating the illuminance level). The processor may determine whether to recognize the gaze data as the user input based on the accuracy and/or the precision of the inferred gaze data. For example, based on the illuminance level in a processor reference range, gaze data located outside the object may be recognized as the user input. The processor may determine that the gaze data located outside the object is not recognized as the user input based on the illuminance level outside the reference range.

For example, the processor may determine a size of an area (e.g., an area for selecting the object) using the parameter indicating the illuminance level. The processor may determine the size of the area indicating a range in which a user input for selecting an object included in the screen is to be obtained. For example, the processor may identify a state of the eye (e.g., a size of a pupil) that changes according to intensity of ambient light (e.g., an illumination level) facing the eye through the display, through the camera. The processor may infer the accuracy and/or the precision of the gaze data according to the changing state of the eye.

For example, the processor may set a size of the area to a first size based on the illuminance level in the reference range. The processor may set the size of the area to a second size greater than the first size based on the illuminance level outside the reference range. The accuracy and/or the precision of the gaze data used to set the size of the area to the second size may be relatively lower than the accuracy and/or the precision of the gaze data used to set the size of the area to the first size. For example, the size of the user's pupil may be reduced by ambient light having the illuminance level outside the reference range. The accuracy and/or the precision of the gaze data obtained using the pupil having the reduced size may be lower than accuracy and/or precision of gaze data obtained using a pupil having another size (the size of the pupil changed by ambient light in the reference range). For example, the area having the first size may be referred to an area 130-1 of FIG. 1, and the area having the second size may be referred to an area 130 of FIG. 1. For example, the processor may determine whether to recognize the inferred gaze data as the user input, based on an overall brightness level of the screen as well as the illuminance level identified through the illuminance sensor. In other words, the processor may determine whether to recognize the gaze data as the user input, using an area for an object having the size set based on the overall brightness level and the illuminance level of the screen.

For example, the processor may determine whether to recognize the gaze data as the user input by checking whether a location indicated by the gaze data is located in the area. For example, the processor may recognize the gaze data as the user input in response to the location in the area for a specified time. For example, the processor may identify that the gaze data is not recognized as the user input in response to the location outside the area.

Referring to FIG. 8, in operation 830, the processor according to an embodiment may execute a function provided from the object, based on the gaze data recognized as the user input. The processor may identify that the object is selected, based on the gaze data recognized as the user input. The processor may execute the function provided from the object using the gaze data recognized as the user input for selecting the object.

Hereinafter, with reference to FIG. 9, an example of an operation in which the wearable device according to an embodiment infers the gaze data for the object using the illuminance level and/or the user's state information will be described in greater detail.

Figure 9:
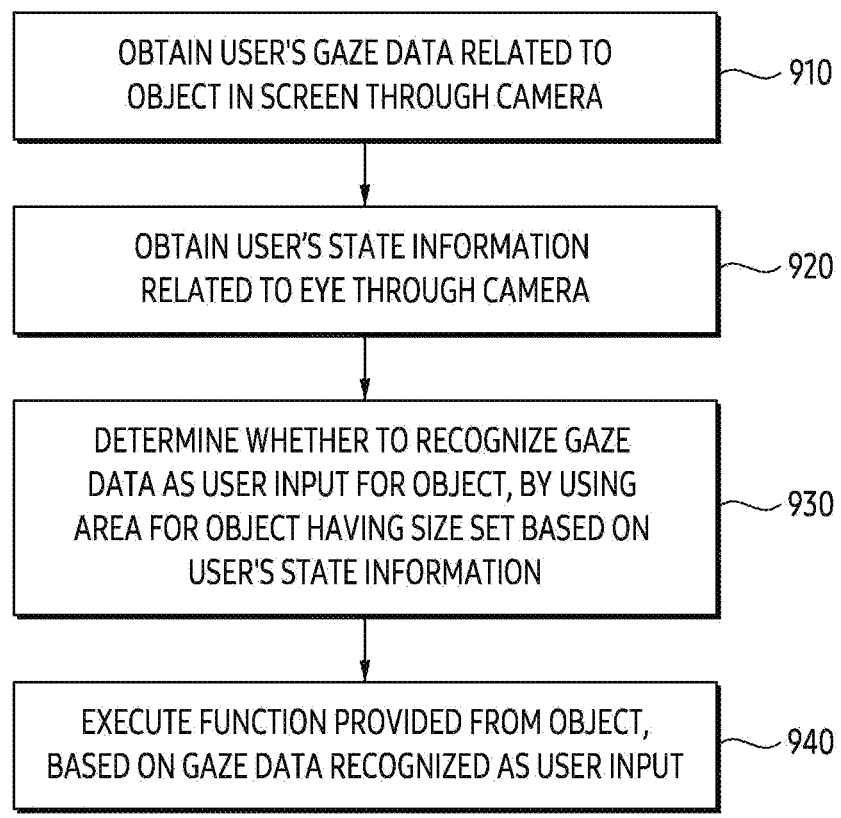
FIG. 9 is a flowchart illustrating an example operation in which a wearable device identifies a user input based on state information according to various embodiments.

FIG. 9 is a flowchart illustrating an example operation in which a wearable device identifies a user input based on state information according to various embodiments. The wearable device of FIG. 9 may include a wearable device 101 of FIGS. 1 to 4. At least one of the operations of FIG. 9 may be performed by the wearable device 101 of FIG. 1. At least one of the operations of FIG. 9 may be controlled by a processor 420 of FIG. 4. Each of the operations of FIG. 9 may be performed sequentially, but is not necessarily performed sequentially. For example, an order of each of the operations may be changed, and at least two operations may be performed in parallel. At least one of the operations of FIG. 9 may be related to at least one of operations of FIG. 8.

Referring to FIG. 9, in operation 910, a processor according to an embodiment may obtain user's gaze data related to an object in a screen through a camera. The processor may identify the user's state information related to the eye using the image, and may infer the gaze data using the identified state information. The operation 910 may be referred to operation 810 of FIG. 8.

Referring to FIG. 9, in operation 920, the processor according to an embodiment may obtain the user's state information related to the eye through the camera. The operation performed by the processor in the operation 920 may be referred to operation of performing operation 720 of FIG. 7.

Referring to FIG. 9, in operation 930, the processor according to an embodiment may determine whether to recognize the gaze data as a user input for the object, using an area for the object having a size set based on the user's state information related to the eye. The processor may set a size of the area for the object, using accuracy and/or precision of the gaze data inferred based on an illuminance level and/or the user's state information.

For example, in a state of identifying an illuminance level identified through an illuminance sensor, the processor may identify the user's state information using the camera. In the state, the processor may infer the accuracy and/or the precision of the gaze data identified through the camera based on the user's state information. In the state, the processor may determine the size of the area using the inferred accuracy and/or precision, by inferring accuracy and/or precision indicating whether the gaze data indicating the user's gaze in the screen is accurate, using the user's state information. The processor may determine a designated time for selecting the area independently of determining the size.

For example, the processor may determine whether to recognize the gaze data as a user input for selecting the object by checking whether the location indicated by the gaze data is located in the area. For example, the processor may recognize the gaze data as the user input, in case that the location of the gaze data is included in the area for a specified time. For example, in case that the location of the gaze data is not included in the area, the processor may determine that the gaze data is not recognized as the user input. A length of the specified time may vary according to the size of the area, but may be set independently of the size.

Referring to FIG. 9, in operation 940, the processor according to an embodiment may execute a function provided from the object, based on the gaze data recognized as the user input. The operation 940 may be related to operation 530 of FIG. 5, operation 630 of FIG. 6, operation 740 of FIG. 7, or operation 830 of FIG. 8.

Figure 10:
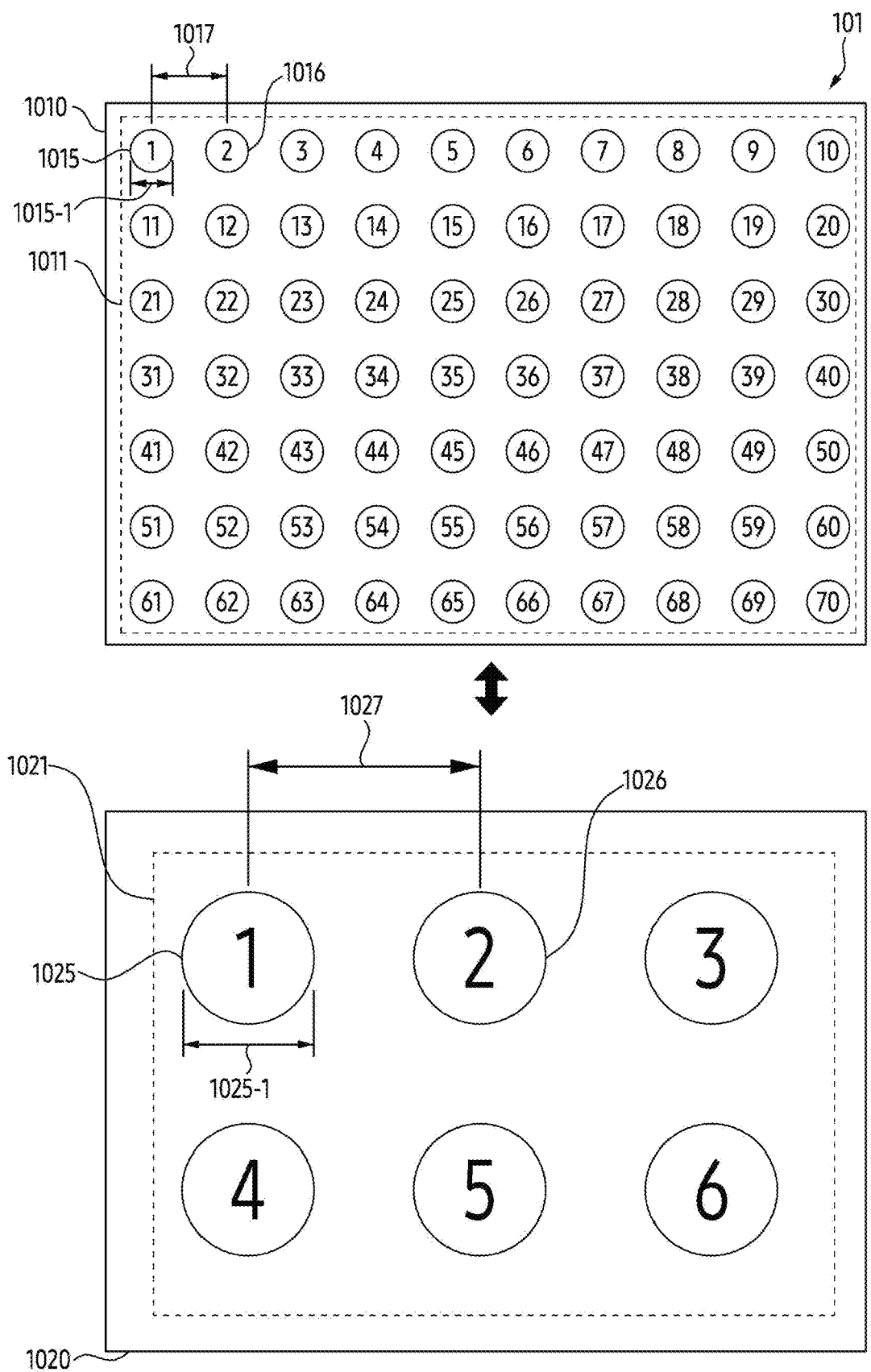
FIG. 10 is a diagram illustrating an example of an area set based on state information according to various embodiments.

FIG. 10 is a diagram illustrating an example of an area set based on state information according to various embodiments. A wearable device 101 of FIG. 10 may include the wearable device 101 of FIGS. 1 to 9.

Referring to FIG. 10, the wearable device 101 according to an embodiment may display a plurality of visual objects 1011 on a screen 1010. A size of each of the plurality of visual objects 1011 may be set based on a size of an area

130-1 of FIG. 1. A wearable device may display the plurality of visual objects 1011 having a size corresponding to the size of the area 130-1 of FIG. 1 in the screen 1010.

For example, the number of a plurality of visual objects to be displayed on a display may be set based on the size of the area (e.g., an area 130 of FIG. 1 and an area 130-2 of the area 130-1). The wearable device 101 may determine the number of the plurality of visual objects 1010 based on the size of the area set based on an overall brightness level of a screen displayed on the display, an illuminance level obtained through an illuminance sensor, state information related to a user's eyes, or a combination thereof.

For example, the wearable device 101 may determine a distance 1017 between a first visual object 1015 and a second visual object 1016 among the plurality of visual objects 1010. The wearable device 101 may determine the distance 1017 between the first visual object 1015 and the second visual object 1016, based on the size of the area for selecting each of the plurality of visual objects 1010. The wearable device 101 may determine the distance 1017 so that an area corresponding to the first visual object 1015 and another area corresponding to the second visual object 1016 do not overlap. The wearable device 101 may display the screen 1010 (e.g., a screen including the plurality of visual objects 1011) including the first visual object 1015 and the second visual object 1016 arranged based on the determined distance 1017, on the display.

The wearable device 101 according to an embodiment may set the number of a plurality of visual objects 1021 based on an area (e.g., the area 130 of FIG. 1) having another size different from a size of an area (e.g., the area 130-1 of FIG. 1) set to display the screen 1010. For example, the wearable device 101 may determine a size of each of the plurality of visual objects 1021 based on the area (e.g., the area 130 of FIG. 1) having the other size.

For example, the wearable device 101 may display a screen 1020 including the plurality of visual objects 1021 having a size larger than the size of each of the plurality of visual objects 1011 included in the screen 1010, on the display. The wearable device 101 may determine the number and/or the size of the plurality of visual objects 1021, based on the size of the area set based on an overall brightness level of the screen 1020, the illuminance level obtained through the illuminance sensor, the state information related to the user's eyes, or a combination thereof. First gaze data used to set the number and/or the size of the plurality of visual objects 1011 included in the screen 1010 and second gaze data used to set the number and/or the size of the plurality of visual objects 1021 included in the screen 1020 may be different.

For example, the wearable device 101 may determine the number of the plurality of visual objects 1011 according to the distance 1017 between the visual objects 1015 and 1016 included in the screen 1010. Since the distance 1017 between the visual objects 1015 and 1016 in the screen 1010 is shorter than a distance 1027 between visual objects 1025 and 1026 in the screen 1020, the number of the plurality of visual objects 1011 may be greater than that of the plurality of visual objects 1021. For example, since the size of the area for selecting one visual object (e.g., the visual object 1015) among the plurality of visual objects 1011 is smaller than the size of the area for selecting one visual object (e.g., the visual object 1025) among the plurality of visual objects 1021, the wearable device 101 may set the number of the plurality of visual objects 1011 more. However, the disclosure is not limited thereto.

For example, an overall brightness level, an illuminance level, and/or state information used to infer the first gaze data and an overall brightness level, an illuminance level, and/or state information used to infer the second gaze data may be different. For example, the user's state related to the eye corresponding to the first gaze data identified to display the screen 1010 may be a state of not wearing glasses, and the user's state related to the eye corresponding to the second gaze data identified to display the screen 1020 may be a state of wearing glasses. Accuracy and/or precision of the gaze data identified in a state that the user wears glasses may be less than accuracy and/or precision of the gaze data identified in a state that the user does not wear glasses. For example, rather than a first difference (e.g., about 2 degrees) between a location of the visual object (e.g., a visual object 120 of FIG. 1) and a location of the gaze data (e.g., gaze data 125 of FIG. 1) identified by the wearable device 101 in the state that the user does not wear glasses, the second difference (e.g., about 7 degrees) between a location of the visual object identified by the wearable device 101 and a location of the gaze data in the state that the user wears glasses may be large. The wearable device 101 may adjust the number and/or the size of the plurality of visual objects 1021 to be displayed based on an area having a size set based on the second difference.

For example, a size 1025-1 of the first visual object 1025 may be larger than a size 1015-1 of the first visual object 1015 included in the screen 1010. Since it has a size larger than the size 1015-1 of the first visual object 1015 (e.g., about 11 times larger), the number of the plurality of visual objects 1021 included in the screen 1020 displayed on the same display may be smaller than the number of the plurality of visual objects 1011 included in the screen 1010.

As described above, the wearable device 101 according to an embodiment may determine the size of the visual object based on the size of the area for selecting the visual object included in the screen. The wearable device 101 may determine the number of the plurality of visual objects to display the plurality of visual objects including the visual object having the determined size on the display. The wearable device 101 may arrange (or align) a plurality of visual objects by spaced apart by a designated distance so that an area capable of identifying an input for each of the plurality of visual objects does not overlap. The wearable device 101 may provide a metaverse service that may be changed according to the user by adjusting the size and/or number of visual objects to be displayed on the display based on the gaze data.

Hereinafter, an example of an operation in which the electronic device 101 displays a visual effect representing a selection for the visual object displayed on the screen will be described in greater detail with reference to FIG. 11.

Figure 11:
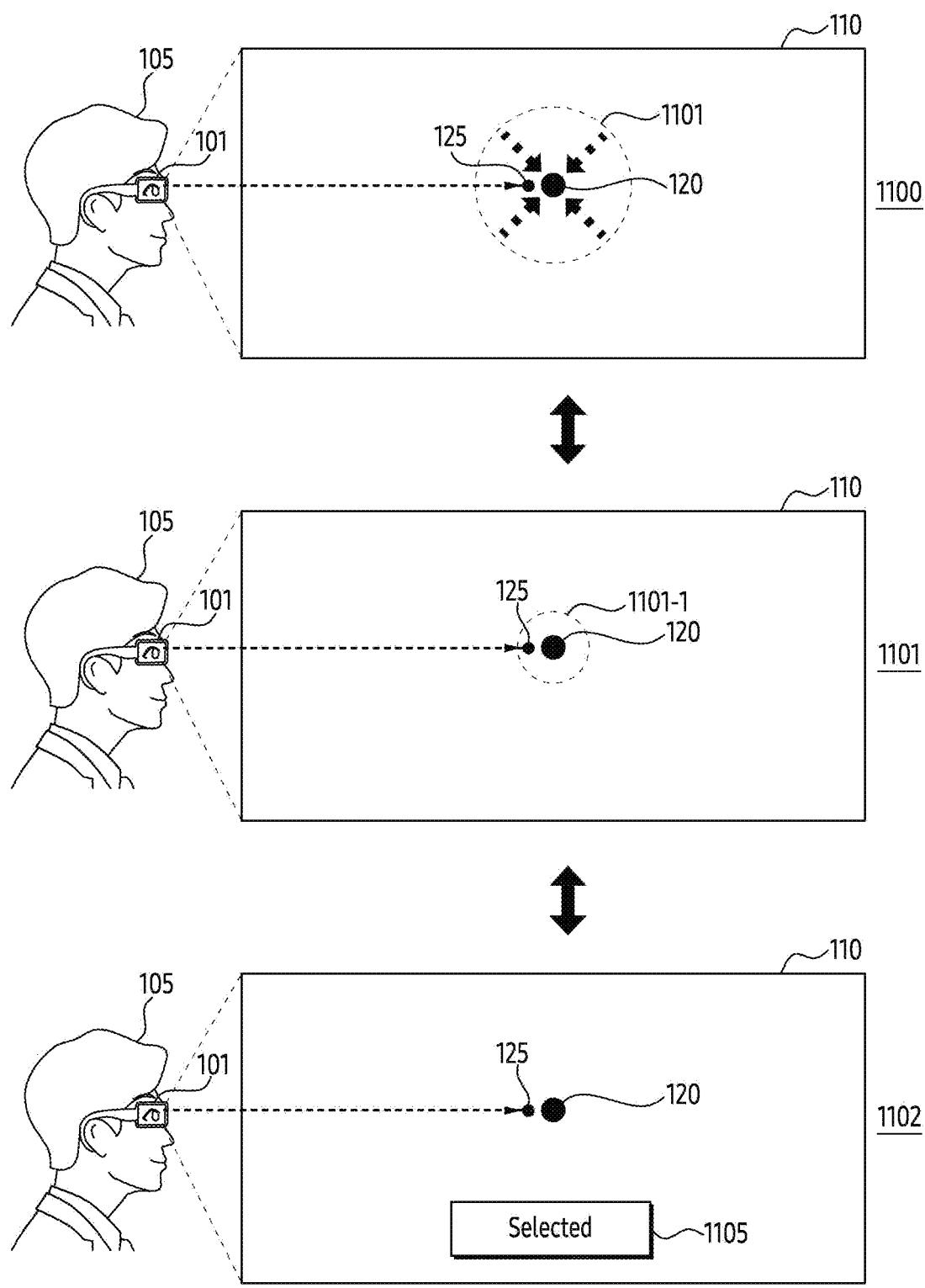
FIG. 11 is a diagram illustrating an example operation in which a wearable device selects an object using an area according to various embodiments.

FIG. 11 is a diagram illustrating an example of an operation in which a wearable device selects an object using an area according to various embodiments. A wearable device 101 of FIG. 11 may include the wearable device 101 of FIGS. 1 to 10.

Referring to FIG. 11, in a state 1100, the wearable device 101 according to an embodiment may display a screen 110 including a visual object 120 on a display. The wearable device 101 may obtain gaze data 125 of a user 105 located adjacent to the visual object 120 in the screen 110 through the camera. The wearable device 101 may obtain the gaze data 125 based on a size of a pupil of a user's eye. For example, the wearable device 101 may identify a change in the size of the pupil based on an overall brightness level of the screen 110. The wearable device 101 may identify the change in the size of the pupil based on an illuminance level indicating brightness around the wearable device 101 identified through a sensor. However, the disclosure is not limited thereto. The wearable device 101 may identify the change in the size of the pupil using state information related to the eyes of the user 105. The state information may include data indicating whether the user 105 wears glasses, data indicating whether the user 105 wears contact lenses, data indicating a size of the eye, data indicating a thickness of the user 105's eyelids, or a combination thereof. The wearable device 101 may identify accuracy and/or precision of the gaze data 125 identified using a brightness level, an illuminance level, and/or state information. The wearable device 101 may set a size of an area 1101 for selecting the visual object 120 based on the accuracy and/or the precision of the gaze data 125. The wearable device 101 may recognize the gaze data 125 as a user input for the visual object 120 based on determination that a location indicated by the gaze data 125 is located in the area 1101 having the set size. For example, the wearable device 101 may not recognize the gaze data 125 as the user input for the visual object 120 based on the determination that the location indicated by the gaze data 125 is located outside the area 1101 having the set size.

For example, in case that the wearable device 101 recognizes the gaze data 125 as the user input for the visual object 120, the wearable device 101 may be identified that a location indicated by the gaze data 125 is included in the area 1101 for a designated time. In case that the wearable device 101 recognizes the gaze data 125 as the user input for the visual object 120, the wearable device 101 may represent a visual effect indicating the designated time. The wearable device 101 may represent a visual effect of decreasing the area 1101 on the display, for the designated time for recognizing the gaze data 125 as the user input for the visual object 120.

In a state 1101 according to an embodiment, in case that the wearable device 101 recognizes the gaze data 125 as the user input for the visual object 120, an area 1101-1 may be displayed based on a visual effect of decreasing a size of the area 1101. The wearable device 101 may guide selection for the visual object 120 to the user, by displaying the visual effect on the display. The operation of displaying the visual effect while the wearable device 101 identifies the selection is not limited to the above-described embodiment. For example, the wearable device 101 may represent the designated time based on a visual object indicating time. For example, the wearable device 101 may display a pointer overlapped on the visual object 120. The pointer may visually indicate the gaze data 125 pointing the visual object 120.

For example, in case that the wearable device 101 identifies a location of the gaze data 125 included in the area 1101 for a designated period of time including from a state 1100 to a state 1102, in the state 1102, the wearable device 101 may display a text object 1105 indicating a selection for the visual object 120 on the display. For example, the wearable device 101 may bypass displaying the text object 1105. The wearable device 101 may execute a function provided from the visual object 120 based on the gaze data 125 recognized as a user input maintained for a designated time (or a reference time).

Figure 12:
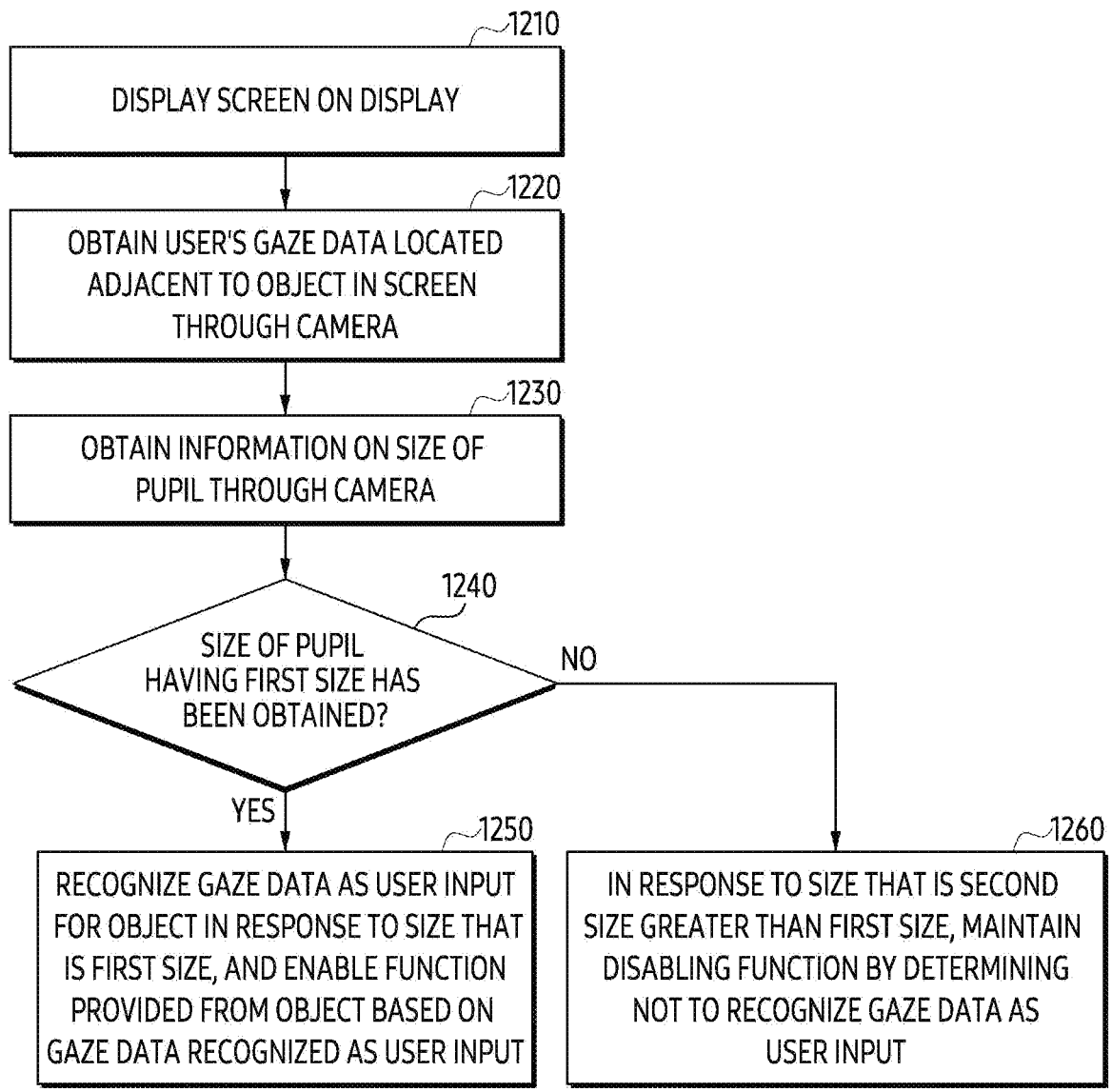
FIG. 12 is a flowchart illustrating an example operation of a wearable device according to various embodiments.

FIG. 12 is a flowchart illustrating an example operation of a wearable device according to various embodiments. The wearable device of FIG. 12 may include a wearable device 101 of FIGS. 1 to 11. At least one of the operations of FIG. 12 may be performed by the wearable device 101 of FIG. 1.

At least one of the operations of FIG. 12 may be controlled by a processor 420 of FIG. 4. Each of the operations of FIG. 12 may be performed sequentially, but is not necessarily performed sequentially. For example, an order of each of the operations may be changed, and at least two operations may be performed in parallel.

Referring to FIG. 12, the wearable device according to an embodiment may display a screen on a display in operation 1210. The operation 1210 may be related to operation 510 of FIG. 5.

Referring to FIG. 12, the wearable device according to an embodiment may obtain user's gaze data located adjacent to the object in the screen through a camera, in operation 1220. The wearable device may obtain the user's gaze data located adjacent to the object (e.g., a visual object 120 of FIG. 1) in the screen through the camera. The wearable device may obtain an image indicating the user's eyes through a camera disposed toward the user's eyes for gaze tracking. The wearable device may obtain the gaze data matching at least a portion of the screen using the image. For example, the wearable device may determine whether the gaze data on the screen is a user input for the object. The wearable device may set an area for determining whether the gaze data is the user input for the object based on a brightness level of the screen. The wearable device may set the size of the area for determining whether the gaze data is the user input for the object based on identifying an illuminance level indicating external brightness of the wearable device through the sensor. The wearable device may set the size of the area using state information related to the user's eyes. The wearable device may determine the number of objects to be included in the screen and the size of the objects based on setting the size of the area.

Referring to FIG. 12, the wearable device according to an embodiment may obtain information on the size of the pupil through the camera, in operation 1230. The wearable device may identify the size of the pupil by analyzing the image indicating the eye through the camera. The wearable device may identify the size of the pupil that changes based on the illuminance level and/or an overall brightness level of the screen. Accuracy and/or precision of the gaze data identified by the wearable device may change according to the size of the pupil. Since the accuracy and/or the precision of the gaze data changes according to the size of the pupil, the size of the area for selecting the object may be set using the size of the pupil.

Referring to FIG. 12, in operation 1240, the wearable device according to an embodiment may identify whether the size of the pupil having a first size has been obtained.

Referring to FIG. 12, in case that the size of the pupil having the first size is obtained (operation 1240—Yes), the wearable device according to an embodiment may recognize the gaze data as the user input for the object in response to the size (e.g., the size of the pupil) that is the first size, in operation 1250, and may enable a function provided from the object based on the gaze data recognized as the user input. In case that a location indicated by the gaze data is located in the area, the wearable device may identify the gaze data as a user input for selecting the object. The wearable device may execute the function provided from the object based on the user input being maintained for a designated time.

Referring to FIG. 12, in response to a size (e.g., the size of the pupil) that is a second size greater than the first size (operation 1240—No), the electronic device according to an embodiment may maintain disabling the function by determining not to recognize the gaze data as the user input in operation 1260. For example, a brightness level and/or an illuminance level corresponding to the size of the pupil of the first size may be higher than a brightness level and/or an illuminance level corresponding to the size of the pupil of the second size. For example, accuracy and/or precision of first gaze data identified using the pupil having the first size may be lower than accuracy and/or precision of second gaze data identified using the pupil having the second size. For example, when the pupil size is the first size, the wearable device may obtain a first area for selecting the object, based on a first difference between a location of the object in the screen and a location indicated by the gaze data corresponding to the first size. For example, when the pupil size is a second size larger than the first size, the wearable device may obtain a second area smaller than the first area, based on a second difference between the location of the object and the location indicated by the gaze data. The first difference may be greater than the second difference. The first difference may be referred to a difference 127 of FIG. 1. However, the disclosure is not limited thereto.

For example, a size of the area for selecting the object determined based on the first gaze data may be larger than a size determined based on the second gaze data. Since the size of the area for selecting the object determined based on the first gaze data is relatively larger, even if the location indicated by the gaze data is included in the size of the area determined based on the first gaze data, it may not be included in the size of the area determined based on the second gaze data. In other words, the wearable device may determine not to recognize the gaze data as the user input based on the size of the pupil, which is the second size larger than the first size.

The wearable device according to an embodiment may determine the number of objects included in the screen based on the size of the pupil. The wearable device may arrange other objects based on a designated distance from the object so that areas for selecting each of the objects do not overlap.

For example, the wearable device may display the screen including the object and another object spaced apart from the object by a first distance. The wearable device may space the distance between the object and the other object apart by the first distance based on the size of the pupil, which is the first size. When the size of the pupil is the second size larger than the first size, the wearable device may display the screen including the object and another object spaced apart from the object by the second distance shorter than the first distance. In case that the size of the pupil is the first size, the size of the area is set to be larger, and thus the distance between the objects may be set to be longer. For example, in case that the size of the pupil is the first size, the number of objects that may be displayed on the display may be less than the number of objects that may be displayed on the display in case that the size of the pupil is the second size.

For example, the wearable device may recognize the gaze data as another user input for another object instead of the user input for the object. The wearable device may identify the gaze data as the other user input for the other object, based on the location of the gaze data located outside the area corresponding to the object and located in the other area corresponding to the other object. The wearable device may enable another function provided from the other object based on the gaze data recognized as the other user input for the designated time. However, the disclosure is not limited thereto.

For example, the wearable device may set an area having the first size for selecting the object using the gaze data identified based on the overall brightness level and/or the illuminance level of the screen. After setting the area having the first size, the wearable device may obtain the user's state information related to the user's eyes through the camera. The wearable device may change the first size to the second size using the state information. However, the disclosure is not limited thereto. The wearable device according to an embodiment may determine a size of an area for selecting an object displayed on the screen based on the overall brightness information of the screen, intensity of ambient light, whether the user wears glasses, whether the user wears content lenses, a thickness of eyelids, or a combination thereof.

Figure 13:
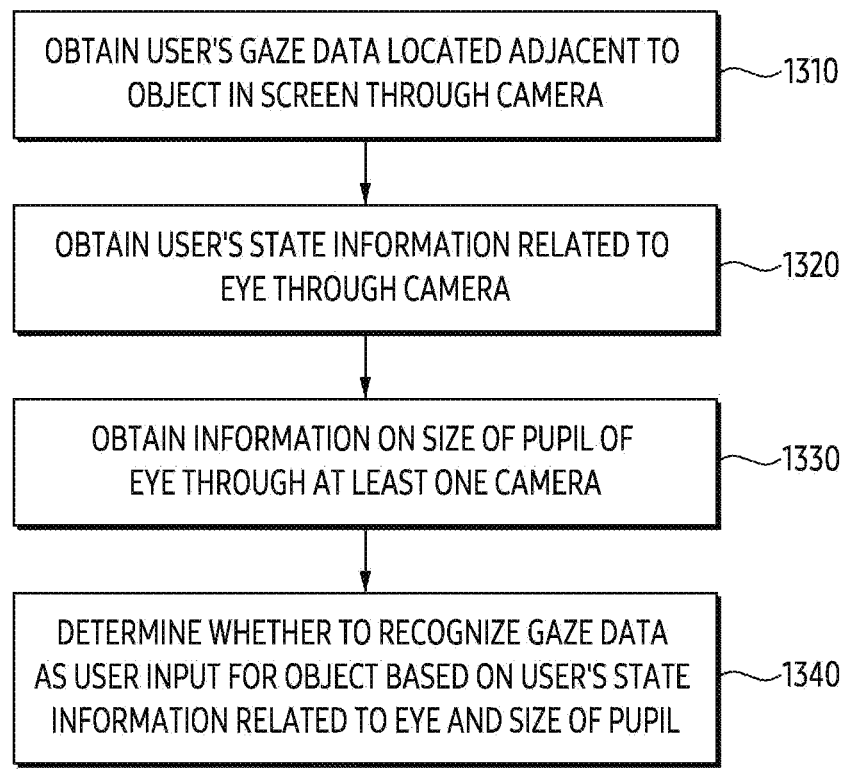
FIG. 13 is a flowchart illustrating an example operation in which a wearable device identifies a user input based on a pupil size, according to various embodiments.

FIG. 13 is a flowchart illustrating an example operation in which a wearable device identifies a user input based on a pupil size, according to various embodiments. The wearable device of FIG. 13 may include a wearable device 101 of FIGS. 1 to 11. At least one of the operations of FIG. 13 may be performed by the wearable device 101 of FIG. 1. At least one of the operations of FIG. 13 may be controlled by a processor 420 of FIG. 4. Each of the operations of FIG. 13 may be performed sequentially, but is not necessarily performed sequentially. For example, an order of each of the operations may be changed, and at least two operations may be performed in parallel.

Referring to FIG. 13, the wearable device according to an embodiment may obtain user's gaze data located adjacent to an object in a screen through a camera, in operation 1310. The operation 1310 may be referred to operation 1220 of FIG. 12.

Referring to FIG. 13, the wearable device according to an embodiment may obtain user's state information related to an eye through the camera, in operation 1320. The wearable device may identify whether the user wears glasses, using the image obtained through the camera. The wearable device may obtain different gaze data based on identifying whether the user wears glasses. The wearable device may infer the different gaze data based on whether the user wears contact lenses. The wearable device may identify the size of the pupil of the eye, using state information including data indicating a size of the eye, data indicating the thickness of the user's eyelids, or a combination thereof.

Referring to FIG. 13, in operation 1330, the wearable device according to an embodiment may obtain information on the size of the pupil of the eye through at least one camera. The wearable device may identify the size of the pupil of the eye using the image obtained through the camera.

Referring to FIG. 13, in operation 1340, the wearable device according to an embodiment may determine whether to recognize gaze data as a user input for an object based on the user's state information related to the eye and the size of the pupil. The wearable device may obtain the gaze data based on the state information and the size of the pupil. The wearable device may set a size of an area for selecting the object based on the state information and the size of the pupil. The wearable device may determine whether to recognize the gaze data as the user input for the object according to whether a location indicated by the gaze data is included in the area for selecting the object.

Figure 14:
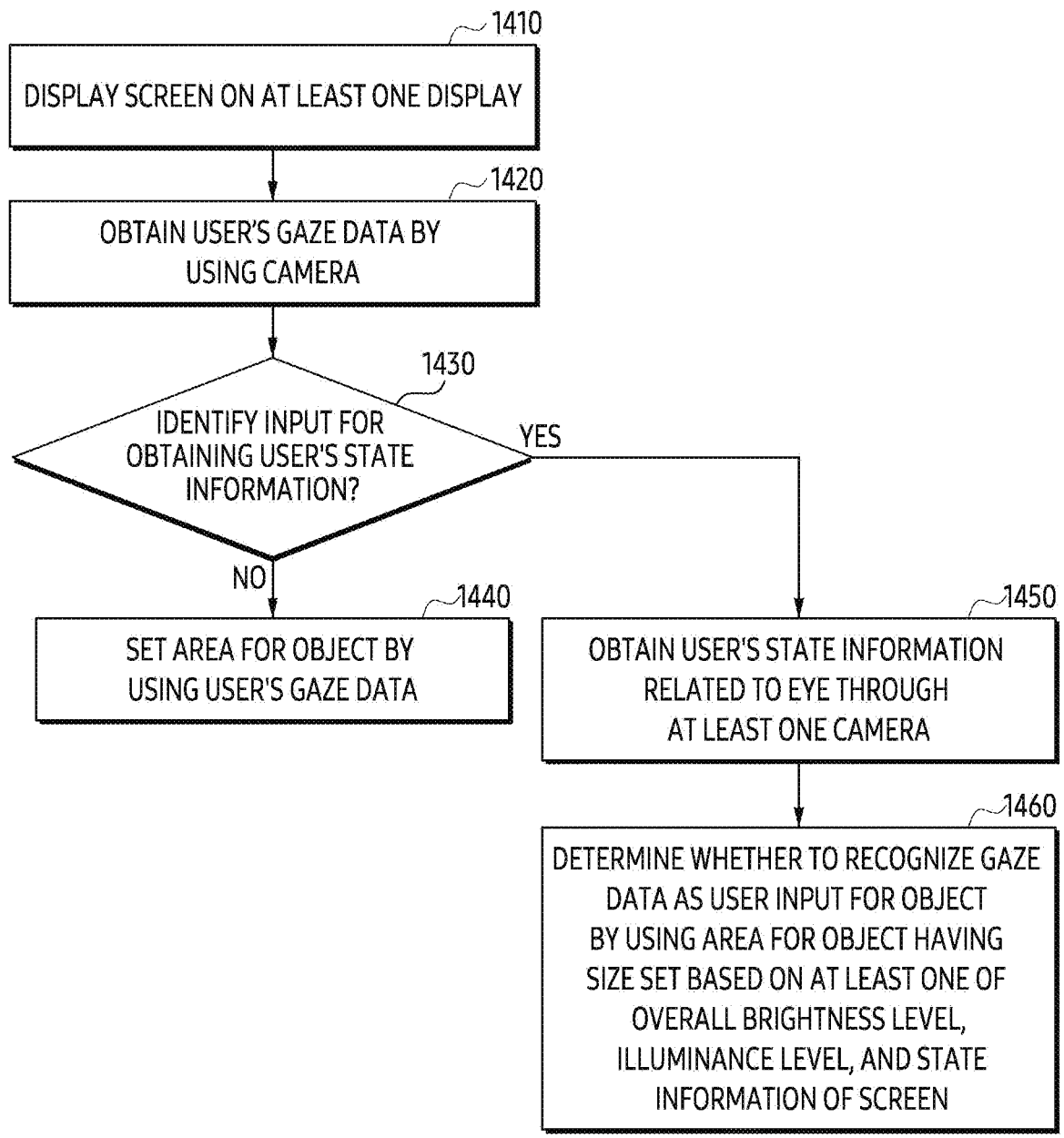
FIG. 14 is a flowchart illustrating an example operation of a wearable device according to various embodiments.

FIG. 14 is a flowchart illustrating an example operation of a wearable device according to various embodiments. The wearable device of FIG. 14 may include a wearable device 101 of FIGS. 1 to 11. At least one of the operations of FIG. 14 may be performed by the wearable device 101 of FIG. 1. At least one of the operations of FIG. 14 may be controlled by a processor 420 of FIG. 4. Each of the operations of FIG.

14 may be performed sequentially, but is not necessarily performed sequentially. For example, an order of each of the operations may be changed, and at least two operations may be performed in parallel.

Referring to FIG. 14, in operation 1410, the wearable device according to an embodiment may display a screen on at least one display. The wearable device may display a screen (e.g., a screen 110 of FIG. 1) including at least one object (e.g., a visual object 120 of FIG. 1) on the display. The operation 1410 may be referred to operation 1210 of FIG. 12.

Referring to FIG. 14, in operation 1420, the wearable device according to an embodiment may obtain user's gaze data using a camera. The wearable device may obtain the gaze data y using an image obtained through the camera. The wearable device may perform user calibration to map the gaze data to at least one location in the screen. After performing the user calibration, the wearable device may further perform an operation for correcting a location of the gaze data.

Referring to FIG. 14, in operation 1430, the wearable device according to an embodiment may identify an input for obtaining user's state information. The state information may include information related to the user's eyes.

Referring to FIG. 14, in case that an input for obtaining the user's state information is not identified (operation 1430—No), in operation 1440, the wearable device according to an embodiment may set an area for an object using the user's gaze data. The wearable device may set a size of an area for selecting the object using gaze data identified using a gaze tracker 433 of FIG. 4.

Referring to FIG. 14, in case that the input for obtaining the user's state information is identified (operation 1430—Yes), in operation 1450, the wearable device according to an embodiment may obtain the user's state information related to the eye through at least one camera. Based on execution of a state information identifier 435 of FIG. 4, the wearable device may obtain state information including data indicating whether the user wears glasses, data indicating whether the user wears contact lenses, data indicating a thickness of the user's eyelids, and/or data indicating a size of the eye, through the camera.

Referring to FIG. 14, in operation 1460, the wearable device according to an embodiment may determine whether to recognize the gaze data as a user input for the object using an area for an object having a size set based on at least one of an overall brightness level, an illuminance level, and state information of the screen. The wearable device may infer (or predict) accuracy and/or precision of the gaze data, based on execution of a gaze predictor 434 of FIG. 4, using the overall brightness level, the illuminance level, and/or the state information of the screen. The wearable device may determine the size of the area for selecting the object based on the inferred accuracy and/or precision. The wearable device may determine whether to recognize the gaze data as the user input according to whether the location of the gaze data matching the screen is located in the area. In case that the location of the gaze data is located in the area for a designated time, the wearable device may initiate performance of a function provided from the object.

Metaverse is a combination of the English words 'Meta', which refers to 'virtual' and 'transcendence', and 'Universe', which refers to space, and refers to a 3 dimensional virtual world in which social, economic, and cultural activities such as the real world take place. The metaverse is a more advanced concept than virtual reality (VR, state-of-the-art technology that allows people to experience real life in a virtual world created by computers), and it is characterized using avatars to not only enjoy games or virtual reality, but also engage in social and cultural activities such as real reality. Based on augmented reality (AR), virtual reality environment (VR), mixed environment (MR), and/or extended reality (XR), the metaverse service may provide media content to enhance immersion in the virtual world.

For example, media content provided by the metaverse service may include social interaction content that includes an avatar-based game, concert, party, and/or meeting. For example, the media content may include information for an economic activity such as advertising, user created content, and/or the sale and/or shopping of productions. Ownership of the user created content may be proved by a blockchain-based non-fungible token (NFT). The metaverse service may support an economic activity based on real money and/or cryptocurrency. By the metaverse service, virtual content linked to the real world, such as digital twin or life logging, may be provided.

Figure 15:
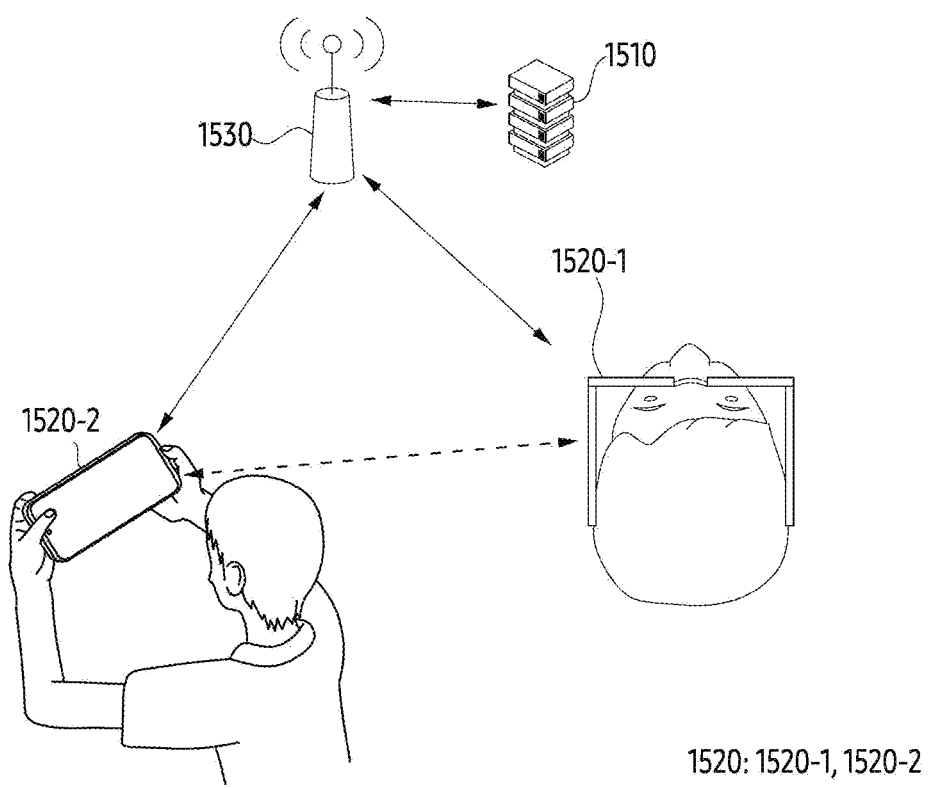
FIG. 15 is a diagram illustrating an example network environment in which a metaverse service is provided through a server according to various embodiments.

FIG. 15 is a diagram illustrating an example network environment 1501 receiving a metaverse service through a server 1510 according to various embodiments.

Referring to FIG. 15, the network environment 1501 may include a server 1510, a user terminal 1520 (e.g., a first terminal 1520-1 and a second terminal 1520-2), and a network connecting the server 1510 and the user terminal 1520. In the network environment 1501, the server 1510 may provide the metaverse service to the user terminal 1520. The network may be formed by at least one intermediate node 1530 including an access point (AP) and/or a base station. The user terminal 1520 may output a user interface (UI) related to the metaverse service to the user of the user terminal 1520, by accessing the server 1510 through the network. Based on the UI, the user terminal 1520 may obtain information to be inputted into the metaverse service from the user, or may output information (e.g., multimedia content) related to the metaverse service to the user.

In this case, the server 1510 provides a virtual space so that the user terminal 1520 may perform an activity in the virtual space. In addition, the user terminal 1520 expresses information provided by the server 1510 to the user or transmits information that the user wants to express in the virtual space to the server, by installing an S/W agent for accessing the virtual space provided by the server 1510. The S/W agent may be provided directly through the server 1510, downloaded from a public server, or provided by being embedded when purchasing the terminal.

In an embodiment, the metaverse service may be provided to the user terminal 1520 and/or the user using the server 1510. The disclosure is not limited thereto, and the metaverse service may be provided through individual contact between users. For example, in the network environment 1501, the metaverse service may be provided by a direct connection between the first terminal 1520-1 and the second terminal 1520-2 independently of the server 1510. Referring to FIG. 15, in the network environment 1501, the first terminal 1520-1 and the second terminal 1520-2 may be connected to each other through a network formed by at least one intermediate node 1530. In an embodiment in which the first terminal 1520-1 and the second terminal 1520-2 are directly connected, any one user terminal among the first terminal 1520-1 and the second terminal 1520-2 may perform a role of the server 1510. For example, a metaverse environment may be configured only by a device-to-device connection (e.g., a peer-to-peer (P2P) connection).

In an embodiment, the user terminal 1520 (or the user terminal 1520 including the first terminal 1520-1 and the second terminal 1520-2) may be made of various form factors, and may include an output device providing an image or/and sound to the user and an input device for inputting information into the metaverse service. For example, various form factors of the user terminal 1520 may include a smartphone (e.g., the second terminal 1520-2), an AR device (e.g., the first terminal 1520-1), a VR device, an MR device, a Video Sec Through (VST) device, an Optical See Through (OST) device, a smart lens, a smart mirror, a TV or projector capable of input and output.

The network (e.g., the network formed by at least one intermediate node 1530) of the present disclosure includes all of various broadband networks including 3G, 4G, and 5G, and short-range networks (e.g., a wired network or wireless network directly connecting the first terminal 1520-1 and the second terminal 1520-2) including WiFi, BT, and the like.

The wearable device according to an embodiment may determine whether the user's gaze data is a user input for selecting an object displayed on the display, based on a state related to the eyes of the user wearing the wearable device and a surrounding environment of the wearable device. In order for the wearable device to recognize the gaze data as a user input for selecting the object, a method of determining the size of the area for the object may be required.

A wearable device (e.g., a wearable device 101 of FIG. 1) according to an example embodiment as described above may comprise: at least one camera (e.g., a camera 440 of FIG. 4) configured for eye tracking, at least one display (e.g., a display 450 of FIG. 4) configured to be aligned with eyes of a user (e.g., a user 105 of FIG. 1) wearing the wearable device, and at least one processor, comprising processing circuitry (e.g., a processor 420 of FIG. 4). At least one processor, individually and/or collectively, may be configured to control the wearable device to display a screen (e.g., a screen 110 of FIG. 1) on the at least one display. At least one processor, individually and/or collectively, may be configured to obtain gaze data (e.g., gaze data 125 of FIG. 1) related to an object (e.g., a visual object 120 of FIG. 1) in the screen through the at least one camera. At least one processor, individually and/or collectively, may be configured to determine whether to recognize the gaze data as an input for the object, using an area (e.g., an area 130 of FIG. 1) for the object that has size set based on an overall brightness level of the screen. At least one processor, individually and/or collectively, may be configured to execute a function provided from the object based on the gaze data recognized as the user input.

For example, at least one processor, individually and/or collectively, may be configured to determine whether to recognize the gaze data as the input, based on checking whether a location indicated by the gaze data is located in the area.

For example, at least one processor, individually and/or collectively, may be configured to: in response to the location in the area, recognize the gaze data as the input. At least one processor, individually and/or collectively, may be configured to, in response to the location outside the area, determine to not recognize the gaze data as the input.

For example, at least one processor, individually and/or collectively, may be configured to: set the size to a first size based on the overall brightness level within a reference range. At least one processor, individually and/or collectively, may be configured to set the size to a second size larger than the first size based on the overall brightness level outside the reference range.

For example, at least one processor, individually and/or collectively, may be configured to: recognize the gaze data located outside the object, as the input, based on the overall brightness level within a reference range. At least one processor, individually and/or collectively, may be configured to determine to not recognize the gaze data located outside the object as the input, based on the overall brightness level outside the reference range.

For example, at least one processor, individually and/or collectively, may be further configured to control the wearable device to display the object having a size corresponding to the set size of the area in the screen.

For example, at least one processor, individually and/or collectively, may be configured to: determine a distance between the object and an other object in the screen based on the size. At least one processor, individually and/or collectively, may be configured to control the wearable device to display the screen including the object and the other object arranged based on the distance on the at least one display.

For example, the wearable device may further comprise an illuminance sensor (e.g., an illuminance sensor 460 of FIG. 4) configured to obtain illuminance level around the wearable device. At least one processor, individually and/or collectively, may be configured to set the size of the area based further on the illuminance level.

For example, at least one processor, individually and/or collectively, may be configured to: obtain state information of the user related to the eye through the at least one camera. At least one processor, individually and/or collectively, may be configured to set the size of the area based further on the state information.

For example, the state information may include data indicating whether the user is wearing glasses, data indicating whether the user is wearing contact lenses, data indicating a size of the eyes, data indicating the thickness of eyelids of the user, or a combination thereof.

A wearable device according to an example embodiment as described above may comprise: at least one camera configured for eye tracking, at least one display configured to be aligned with eyes of a user wearing the wearable device, and at least one processor comprising processing circuitry. The at least one processor, individually and/or collectively, may be configured to: control the wearable device to display a screen on the at least one display. At least one processor, individually and/or collectively, may be configured to obtain gaze data located adjacent to the object in the screen through the at least one camera. At least one processor, individually and/or collectively, may be configured to obtain information on a size of a pupil of the eye through the at least one camera. At least one processor, individually and/or collectively, may be configured to recognize the gaze data as an input for the object in response to a first size, and enable a function provided from the object based on the gaze data recognized as the input. At least one processor, individually and/or collectively, may be configured to maintain disabling the function by determining to not recognize the gaze data as the input in response to a second size larger than the first size.

For example, at least one processor, individually and/or collectively, may be configured to: based on the size being the first size, obtain a first area for the object and recognize the gaze data as the input based on determination that the location indicated by the gaze data is located in the first area. At least one processor, individually and/or collectively, may be configured to, based on the size being the second size, obtain a second area for the object that is narrower than the first area and determine to not recognize the gaze data as the input based on determination that the location is located outside the second area.

For example, at least one processor, individually and/or collectively, may be configured to: based on the size being the first size, control the wearable device to display the screen including the object and another object spaced apart from the object by a first distance. At least one processor, individually and/or collectively, may be configured to, based on the size being the second size, control the wearable device to display the screen including the object and an other object spaced apart from the object by a second distance shorter than the first distance.

For example, at least one processor, individually and/or collectively, may be configured to control the wearable device to display a pointer overlapped on the object before enabling the function in response to the first size.

For example, the screen may further include another object displayed together with the object. At least one processor, individually and/or collectively, may be configured to recognize the gaze data as another input for the other object instead of the input for the object and enable another function provided from the other object based on the gaze data recognized as the other input, in response to the second size.

For example, at least one processor, individually and/or collectively, may be configured to obtain the user's state information related to the eye through the at least one camera. At least one processor, individually and/or collectively, may be configured to maintain disabling the function by determining to not recognize the gaze data as the input despite the first size, based on the state information.

For example, the state information may include data indicating whether the user is wearing glasses, data indicating whether the user is wearing contact lenses, data indicating a size of the eyes, data indicating the thickness of eyelids of the user, or a combination thereof.

For example, at least one processor, individually and/or collectively, may be configured to: obtain the first area based on a first difference between a location of the object in the screen and a location indicated by the gaze data, based on the size being the first size. At least one processor, individually and/or collectively, may be configured to obtain the second area smaller than the first area based on a second difference between the location of the object and the location indicated by the gaze data, based on the size being the second size.

For example, at least one processor, individually and/or collectively, may be configured to set the size of an area for the object based on the location of the object in the screen.

According to an example embodiment, a method executed in a wearable device having at least one camera for eye tracking, and at least one display configured to be aligned with eyes of a user wearing the wearable device according to an example embodiment as described above, the method may comprise: displaying a screen on the at least one display. The method may comprise obtaining gaze data related to an object in the screen through the at least one camera. The method may comprise determining whether to recognize the gaze data as an input for the object, using an area for the object that has size set based on an overall brightness level of the screen. The method may comprise executing a function provided from the object based on the gaze data recognized as the input.

In a non-transitory computer-readable storage medium storing one or more programs according to an example embodiment as described above, the one or more programs, when executed by at least one processor, individually and/or collectively, of a wearable device having at least one camera configured for eye tracking and the at least one display configured to be aligned with eyes of a use wearing the wearable device, may comprise instructions that cause the wearable device to: display a screen on the at least one display. The one or more programs, when executed by a wearable device, may comprise instructions that cause the wearable device to obtain gaze data related to an object in the screen through the at least one camera. The one or more programs, when executed by a wearable device, may comprise instructions that cause the wearable device to determine whether to recognize the gaze data as an input for the object, using an area for the object that has size set based on an overall brightness level of the screen. The one or more programs, when executed by a wearable device, may comprise instructions that cause the wearable device to execute a function provided from the object based on the gaze data recognized as the input.

As described above, the wearable device according to an example embodiment may comprise: at least one camera configured for eye tracking, at least one display configured to be aligned with eyes of a user wearing the wearable device, and at least one processor, comprising processing circuitry. At least one processor, individually and/or collectively, may be configured to: control the wearable device to display a screen on the at least one display. At least one processor, individually and/or collectively, may be configured to obtain the user's state information related to the eye and the user's gaze data related to the object in the screen through the at least one camera. At least one processor, individually and/or collectively, may be configured to, based on the object being displayed at a first location in the screen, determine whether to recognize the gaze data as an input for the object using the first area for the object having a size set based on the state information. At least one processor, individually and/or collectively, may be configured to, based on the object being distinct from a first location in the screen and displayed at a second location adjacent to at least one of the edges of the screen, determine whether to recognize the gaze data as an input for the object using a second area for the object having an other size set based on the state information. The other size of the second area may be larger than the size of the first area.

The effect that may be obtained in the present disclosure is not limited to the above-mentioned effects, and other effects not mentioned will be clearly understood by those who have ordinary knowledge in the technical field to which the present disclosure belongs.

The device described above may be implemented as a hardware component, a software component, and/or a combination of a hardware component and a software component. For example, the devices and components described in the various example embodiments may be implemented using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but those skilled in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to an example embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include may be those configured to store program instructions, including a magnetic medium such as a hard disk, floppy disk, and magnetic tape, optical recording medium such as a CD-ROM and DVD, magneto-optical medium, such as a floptical disk, and ROM, RAM, flash memory, and the like. In addition, examples of other media may include recording media or storage media managed by app stores that distribute applications, sites that supply or distribute various software, servers, and the like.

As described above, although various example illustrative embodiments have been described, one skilled in the art will recognize that various modifications and may be made without departing from full scope of the disclosure, including the appended claims and their equivalents. For example, even if the described technologies are performed in a different order from the described method, and/or the components of the described system, structure, device, circuit, and the like are coupled or combined in a different form from the described method, or replaced or substituted by other components or equivalents, appropriate a result may be achieved. It will also be understood that any of the embodiment(s) described herein may be used in conjunction with any other embodiment(s) described herein.

No claim element is to be construed under the provisions of 35 U.S.C. § 112, sixth paragraph, unless the element is expressly recited using the phrase "means for" or "means."

What is claimed is:

1. A head-wearable electronic device, comprising:
   at least one camera configured to obtain gaze data of a user wearing the head-wearable electronic device;
   displays, when the head-wearable electronic device is worn, respectively positioned in front of eyes of the user;
   at least one processor comprising processing circuitry; and
   memory comprising one or more storage media storing instructions that,
   when executed by the at least one processor, individually and/or collectively, cause the head-wearable electronic device to:
   identify, via the at least one camera, a size of a pupil of the user;
   based on the size of the pupil of the user, determine an area for identifying a gaze input on a user interface (UI) object to be displayed via the displays;
   display, via the displays, the UI object; and
   based on a gaze positioned within the determined area being identified via the at least one camera while displaying the UI object, execute a function provided by the UI object,
   wherein the area is:
   when the size of the pupil is identified as a first size, determined as a first area; and
   when the size of the pupil is identified as a second size smaller than the first size, determined as a second area wider than the first area.

2. The head-wearable electronic device of claim 1, wherein the area is wider as the size of the pupil of the user is smaller.

3. The head-wearable electronic device of claim 1, wherein the instructions, when executed by the at least one processor, individually and/or collectively, cause the head-wearable electronic device to:
   based on a gaze positioned outside the determined area being identified via the at least one camera while displaying the UI object, maintain disabling the function provided by the UI object.

4. The head-wearable electronic device of claim 1, wherein the UI object is included in the area.

5. The head-wearable electronic device of claim 1, wherein a size of the UI object is determined based on the size of the pupil of the user.

6. The head-wearable electronic device of claim 1, wherein the instructions, when executed by the at least one processor individually and/or collectively, cause the head-wearable electronic device to:
   based on the size of the pupil of the user, display, via the displays, a screen including the UI object and another UI object,
   wherein the UI object and the another UI object are arranged in the screen such that the area and another area for identifying a gaze input on the another UI object are arranged without overlapping.

7. The head-wearable electronic device of claim 1, further comprising:
   an illuminance sensor configured to obtain illuminance data around the head-wearable electronic device; and
   wherein the instructions, when executed by the at least one processor individually and/or collectively, cause the head-wearable electronic device to:
   identify, via the illuminance sensor, brightness of outside of the head-wearable electronic device; and
   further based on the brightness of the outside of the head-wearable electronic device, determine the area for identifying the gaze input on the UI object.

8. The head-wearable electronic device of claim 1, wherein the instructions, when executed by the at least one processor individually and/or collectively, cause the head-wearable electronic device to:
   identify brightness set on a screen for displaying via the displays; and
   further based on the brightness, determine the area for identifying the gaze input on the UI object.

9. The head-wearable electronic device of claim 1,
wherein the UI object is included in a screen being displayed via the displays,
wherein the instructions, when executed by the at least one processor, individually and/or collectively, cause the head-wearable electronic device to:
further based on a position of the UI object in the screen, determine the area for identifying the gaze input on the UI object,
wherein the area is wider as the position of the UI object is adjacent to an edge of the screen.

10. The head-wearable electronic device of claim 9,
wherein the instructions, when executed by the at least one processor individually and/or collectively, cause the head-wearable electronic device to:
obtain, via the at least one camera, state information associated with the eyes of the user; and
further based on the state information, determine the area for identifying the gaze input on the UI object,
wherein the state information includes at least one of data indicating whether the user is wearing glasses, data indicating whether the user is wearing contact lenses, data indicating a size of the eyes, or data indicating thickness of eyelids of the user.

11. A head-wearable electronic device, comprising:
at least one camera configured to obtain gaze data of a user wearing the head-wearable electronic device;
displays, when the head-wearable electronic device is worn, respectively positioned in front of eyes of the user;
at least one processor comprising processing circuitry; and
memory comprising one or more storage media storing instructions that, when executed by the at least one processor individually and/or collectively, cause the head-wearable electronic device to:
identify, via the at least one camera, a size of a pupil of the user;
based on the size of the pupil of the user, determine a size of a UI object, to be displayed via the displays, configured to provide a function in response to a gaze input; and
display, via the displays, the UI object having the determined size,
wherein the size of the UI object is:
when the size of the pupil is identified as a first size, determined as a second size; and
when the size of the pupil is identified as a third size smaller than the first size, determined as a fourth size larger than the second size.

12. The head-wearable electronic device of claim 11,
wherein the size of the UI object is larger as the size of the pupil of the user is smaller.

13. The head-wearable electronic device of claim 11,
wherein the instructions, when executed by the at least one processor individually and/or collectively, cause the head-wearable electronic device to:
based on the size of the pupil of the user, determine an area for identifying a gaze input on the UI object; and
based on a gaze positioned within the determined area being identified via the at least one camera while displaying the UI object, execute a function provided by the UI object.

14. The head-wearable electronic device of claim 13,
wherein the area includes the UI object.

15. The head-wearable electronic device of claim 11,
wherein the instructions, when executed by the at least one processor individually and/or collectively, cause the head-wearable electronic device to:
display, via the displays,
a screen including the UI object having the determined size and another UI object having a size in accordance with the size of the pupil of the user,
wherein a distance between the UI object and the another UI object is greater as the size of the pupil of the user is smaller.

16. The head-wearable electronic device of claim 11, further comprising:
an illuminance sensor configured to obtain illuminance data around the head-wearable electronic device; and
wherein the instructions, when executed by the at least one processor individually and/or collectively, cause the head-wearable electronic device to:
identify, via the illuminance sensor, brightness of outside of the head-wearable electronic device; and
further based on the brightness of the outside of the head-wearable electronic device, determine the size of the UI object.

17. The head-wearable electronic device of claim 11,
wherein the instructions, when executed by the at least one processor individually and/or collectively, cause the head-wearable electronic device to:
identify brightness set on a screen for displaying via the displays; and
further based on the brightness, determine the size of the UI object.

18. The head-wearable electronic device of claim 11,
wherein the UI object is included in a screen being displayed via the displays,
wherein the instructions, when executed by the at least one processor individually and/or collectively, cause the head-wearable electronic device to:
further based on a position of the UI object in the screen, determine the size of the UI object,
wherein the size of the UI object is larger as the position of the UI object is adjacent to an edge of the screen.

19. The head-wearable electronic device of claim 18,
wherein the instructions, when executed by the at least one processor individually and/or collectively, cause the head-wearable electronic device to:
obtain, via the at least one camera, state information associated with the eyes of the user; and
further based on the state information, determine the size of the UI object,
wherein the state information includes at least one of data indicating whether the user is wearing glasses, data indicating whether the user is wearing contact lenses, data indicating a size of the eyes, or data indicating thickness of eyelids of the user.

20. A method performed by a head-wearable electronic device with at least one camera configured to obtain gaze data and displays, the method comprising:
identifying, via the at least one camera, a size of a pupil of a user wearing the head-wearable electronic device;
based on the size of the pupil of the user, determining an area for identifying a gaze input on a UI object to be displayed via the displays;
displaying, via the displays, the UI object; and
based on a gaze positioned within the determined area being identified via the at least one camera while displaying the UI object, executing a function provided by the UI object, wherein the area is:
  when the size of the pupil is identified as a first size, determined as a first area; and
  when the size of the pupil is identified as a second size smaller than the first size, determined as a second area wider than the first area.

* * * * *